US011137161B2

(12) United States Patent
Ock et al.

(10) Patent No.: US 11,137,161 B2
(45) Date of Patent: Oct. 5, 2021

(54) DATA LEARNING SERVER AND METHOD FOR GENERATING AND USING LEARNING MODEL THEREOF

(71) Applicant: Samsung Electronics Co., Ltd., Suwon-si (KR)

(72) Inventors: Hyun-woo Ock, Suwon-si (KR); Min-kyong Kim, Seongnam-si (KR); Tan Kim, Suwon-si (KR); Hyung-seon Song, Suwon-si (KR); Dong-jun Shin, Seoul (KR); Sung-bin Im, Yongin-si (KR); Hyeong-joon Seo, Suwon-si (KR); Young-ju Joo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/941,687

(22) Filed: Mar. 30, 2018

(65) Prior Publication Data
US 2018/0283723 A1    Oct. 4, 2018

Related U.S. Application Data

(60) Provisional application No. 62/479,207, filed on Mar. 30, 2017.

(30) Foreign Application Priority Data

Sep. 25, 2017   (KR) .......................... 10-2017-0123239

(51) Int. Cl.
*F24F 11/63*    (2018.01)
*G05B 15/02*    (2006.01)
(Continued)

(52) U.S. Cl.
CPC .............. *F24F 11/63* (2018.01); *F24F 11/58* (2018.01); *F24F 11/64* (2018.01); *G05B 15/02* (2013.01);
(Continued)

(58) Field of Classification Search
CPC .......... F24F 11/523; F24F 11/58; F24F 11/63; F24F 11/64; F24F 11/65; F24F 2110/10;
(Continued)

(56) References Cited

U.S. PATENT DOCUMENTS 5,211,332 A  *  5/1993  Adams ............... G05D 23/1917
                                                        236/78 D
6,402,043 B1 *  6/2002  Cockerill ........... G05D 23/1919
                                                        165/11.1
(Continued)

FOREIGN PATENT DOCUMENTS

CN       1427211 A      7/2003
CN      103138395 A     6/2013
(Continued)

OTHER PUBLICATIONS

Hwang et al., Load Forecasting using Hierarchical Clustering Method for Building, The Transactions of the Korean Institute of Electrical Engineers, vol. 64, No. 1, pp. 41-47, Jan. 1, 2015, http://dx.doi.org/10.5370/KIEE.2015.64.1.041.
(Continued)

*Primary Examiner* — Kidest Bahta
(74) *Attorney, Agent, or Firm* — Jefferson IP Law, LLP

(57)  ABSTRACT

An apparatus and a method for a data learning server is provided. The apparatus of the disclosure includes a communicator configured to communicate with an external device, at least one processor configured to acquire a set temperature set in an air conditioner and a current temperature of the air conditioner at the time of setting the temperature via the communicator, and a generate or renew a learning model using the set temperature and the current temperature, and a storage configured to store the generated or renewed learning model to provide a recommended temperature to be set in the air conditioner as a result of generating or renewing the learning model. For example, the
(Continued)

data learning server of the disclosure may generate a learned learning model to provide a recommended temperature using a neural network algorithm, a deep learning algorithm, a linear regression algorithm, or the like as an artificial intelligence algorithm.

30 Claims, 19 Drawing Sheets

(51) Int. Cl.
*F24F 11/58* (2018.01)
*F24F 11/64* (2018.01)
*F24F 110/12* (2018.01)
*G06N 20/00* (2019.01)
*F24F 130/10* (2018.01)
*F24F 11/523* (2018.01)
*F24F 110/10* (2018.01)
*F24F 11/65* (2018.01)
*F24F 110/22* (2018.01)

(52) U.S. Cl.
CPC ............ *F24F 11/523* (2018.01); *F24F 11/65* (2018.01); *F24F 2110/10* (2018.01); *F24F 2110/12* (2018.01); *F24F 2110/22* (2018.01); *F24F 2130/10* (2018.01); *G05B 2219/2614* (2013.01); *G06N 20/00* (2019.01)

(58) Field of Classification Search
CPC ............ F24F 2110/12; F24F 2110/22; F24F 2130/10; G05B 15/02; G05B 2219/2614; G06N 20/00; H04L 67/125; H04L 12/2803; H04L 12/2816; G01K 13/00
See application file for complete search history.

(56) References Cited

U.S. PATENT DOCUMENTS

| | | | |
|---|---|---|---|
| 7,958,219 B2 | 6/2011 | Collins et al. | |
| 8,355,890 B2 | 1/2013 | Vangilder et al. | |
| 8,523,082 B2* | 9/2013 | Kammer | A61M 5/445 219/430 |
| 8,639,482 B2 | 1/2014 | Rasmussen et al. | |
| 9,753,465 B1 | 9/2017 | Ghose | |
| 9,817,375 B2 | 11/2017 | Li et al. | |
| 10,012,965 B2 | 7/2018 | Bartenbach et al. | |
| 10,168,677 B2 | 1/2019 | Funes | |
| 2006/0117767 A1 | 6/2006 | Mowris | |
| 2007/0045444 A1* | 3/2007 | Gray | F23N 5/022 236/94 |
| 2008/0306632 A1* | 12/2008 | Miki | F24F 11/30 700/276 |
| 2012/0125559 A1* | 5/2012 | Fadell | G05D 23/1902 165/11.2 |
| 2012/0126021 A1* | 5/2012 | Warren | G05D 23/1902 236/1 C |
| 2012/0221151 A1* | 8/2012 | Steinberg | G05D 23/00 700/276 |
| 2013/0054758 A1* | 2/2013 | Imes | H04L 47/70 709/219 |
| 2013/0099011 A1* | 4/2013 | Matsuoka | F24F 11/70 236/1 C |
| 2013/0318217 A1* | 11/2013 | Imes | H04L 43/08 709/221 |
| 2014/0074300 A1* | 3/2014 | Shilts | G05D 23/01 700/276 |
| 2014/0208219 A1 | 7/2014 | Kim et al. | |
| 2015/0184881 A1 | 7/2015 | Bartenbach et al. | |
| 2015/0248118 A1 | 9/2015 | Li et al. | |
| 2016/0139575 A1 | 5/2016 | Funes | |
| 2016/0178226 A1* | 6/2016 | Daubman | F24F 11/62 700/278 |
| 2016/0246269 A1 | 8/2016 | Ahmed et al. | |
| 2019/0008072 A1 | 1/2019 | Morgan et al. | |

FOREIGN PATENT DOCUMENTS

| | | | |
|---|---|---|---|
| CN | 103942243 A | 7/2014 | |
| CN | 105717960 A | 6/2016 | |
| JP | 5511698 B2 | 6/2014 | |
| JP | 2016-056973 A | 4/2016 | |
| JP | 6106019 B2 | 3/2017 | |
| JP | 6118975 B2 | 5/2017 | |
| KR | 10-0134727 B1 | 4/1998 | |
| KR | 10-2005-0030049 A | 3/2005 | |
| KR | 10-0715999 B1 | 5/2007 | |
| KR | 10-0765170 B1 | 10/2007 | |
| KR | 10-2014-0045109 A | 4/2014 | |
| KR | 20-0478906 Y1 | 12/2015 | |
| KR | 10-1615977 B1 | 4/2016 | |
| KR | 10-2016-0120607 A | 10/2016 | |
| KR | 10-1800310 B1 | 11/2017 | |
| WO | 2015/014229 A1 | 2/2015 | |
| WO | WO 2016/182434 A1 * | 11/2016 | ......... G05D 23/1931 |

OTHER PUBLICATIONS

Korean Office Action dated Jul. 3, 2019, issued in Korean Application No. 10-2018-0081877.
Extended European Search Report dated May 23, 2019, issued in European Application No. 18753038.1.
European Office Action dated Feb. 5, 2020, issued in European Patent Application No. 18 753 038.1.
European Summons to oral proceedings dated Oct. 30, 2020, issued in European Patent Application No. 18 753 038.1.
European Summons to oral proceedings dated Nov. 20, 2020, issued in European Patent Application No. 18 753 038.1.
Chinese Office Action dated Dec. 25, 2020, issued in Chinese Patent Application No. 201880022241.2.
U.S. Notice of Allowance dated Dec. 16, 2020, issued in U.S Appl. No. 16/383,147.
Chinese Office Action dated Jun. 9, 2021, issued in Chinese Patent Application No. 201880022241.2.

* cited by examiner

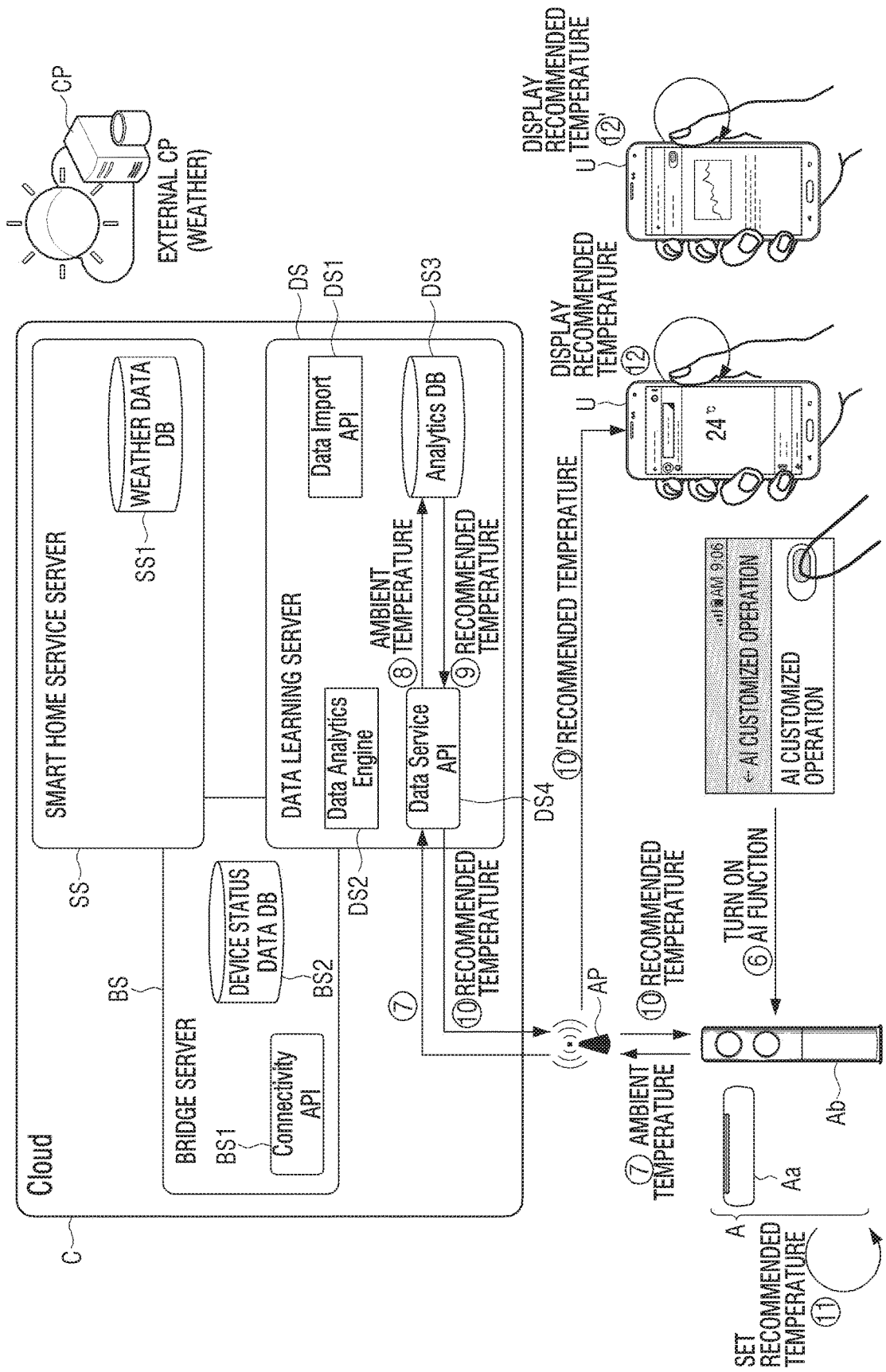

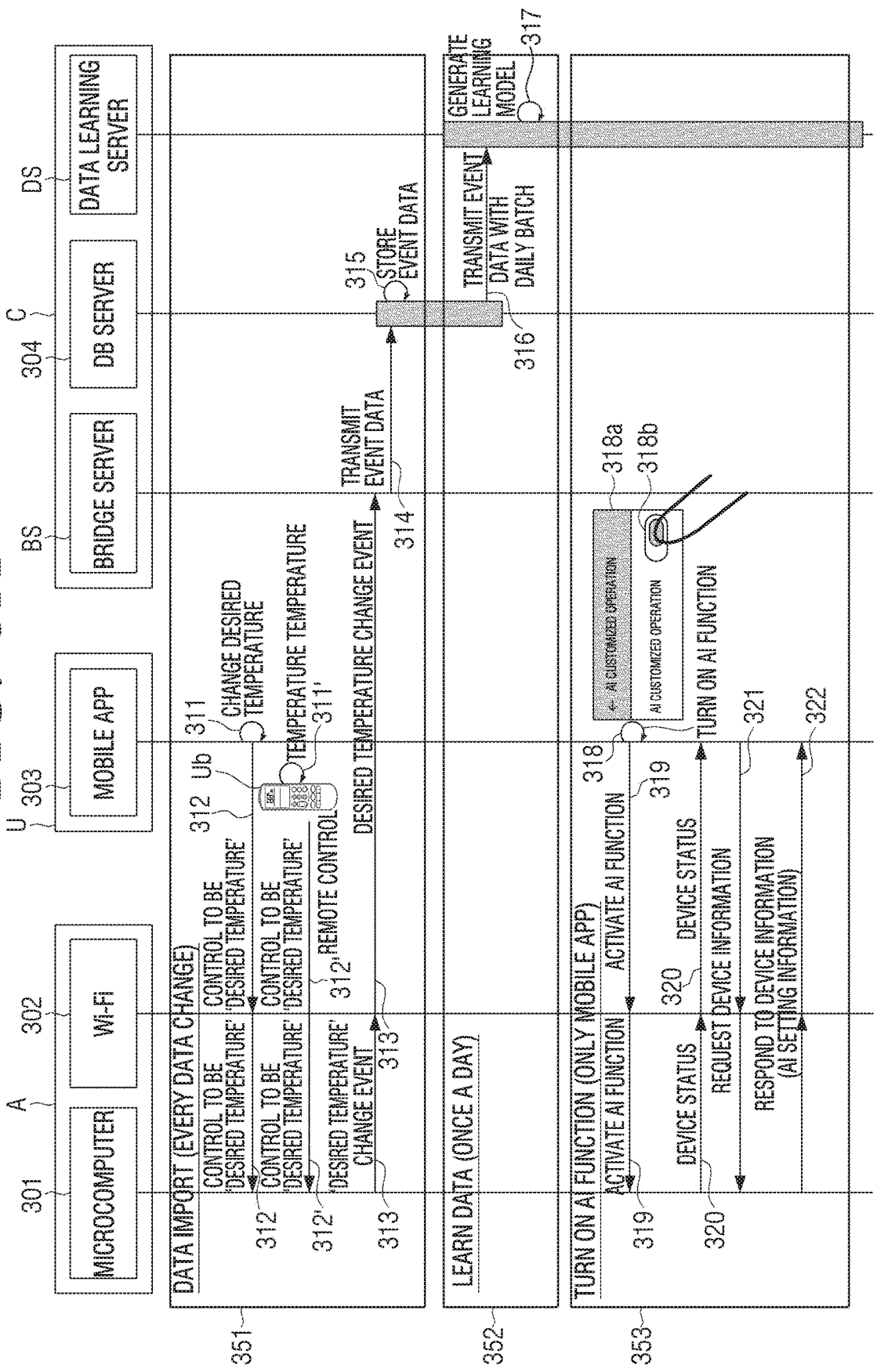

FIG. 4

| Type | Mode | Data / Modeling Method | Learning Data | Learning | Set Range |
|---|---|---|---|---|---|
| FAC (Floor Air Conditioner) | SMART COMFORT | DATA | ROOM TEMPERATURE DESIRED TEMPERATURE | CURRENT TEMPERATURE, OUTSIDE TEMPERATURE, OUTSIDE HUMIDITY, DESIRED TEMPERATURE. HOWEVER, LEARN AT CURRENT TEMPERATURE AND DESIRED TEMPERATURE WHEN THERE IS NO AREA INFORMATION IN RAW DATA UPLOADED FROM DEVICE | 22°C TO 26°C |
| | | MODELING METHOD | IMPORT DATA DURING A SPECIFIC PERIOD OF TIME WHEN DESIRED TEMPERATURE IS CHANGED, BASED ON ROOM TEMPERATURE DATA | BASED ON DATA OF ROOM TEMPERATURE, OUTSIDE TEMPERATURE, AND OUTSIDE HUMIDITY AT THE TIME OF CHANGING DATA DESIRED TEMPERATURE FOR EACH DEVICE. HOWEVER, LEARN AT CURRENT TEMPERATURE AND DESIRED TEMPERATURE WHEN THERE IS NO AREA INFORMATION IN RAW DATA UPLOADED FROM DEVICE | |
| | TROPICAL NIGHT SOUND SLEEP | DATA | ROOM TEMPERATURE DESIRED TEMPERATURE | CURRENT TEMPERATURE, OUTSIDE TEMPERATURE, OUTSIDE HUMIDITY, DESIRED TEMPERATURE. HOWEVER, LEARN AT CURRENT TEMPERATURE AND DESIRED TEMPERATURE WHEN THERE IS NO AREA INFORMATION IN RAW DATA UPLOADED FROM DEVICE | 18°C TO 30°C |
| | | MODELING METHOD | IMPORT DATA FOR SPECIFIC PERIOD BASED ON ROOM TEMPERATURE DATA AT THE TIME OF CHANGING DESIRED TEMPERATURE IN TIMEZONE OF 20 TO 06 | DATA FOR EACH DEVICE BASED ON DATA OF ROOM TEMPERATURE, OUTSIDE TEMPERATURE, AND OUTSIDE HUMIDITY AT THE TIME OF CHANGING DESIRED TEMPERATURE FOR TROPICAL NIGHT SOUND SLEEP / NO-WIND TROPICAL NIGHT SOUND SLEEP MODE | |
| | NO-WIND TROPICAL NIGHT SOUND SLEEP | DATA | ROOM TEMPERATURE DESIRED TEMPERATURE | CURRENT TEMPERATURE, OUTSIDE TEMPERATURE, OUTSIDE HUMIDITY, DESIRED TEMPERATURE. HOWEVER, LEARN AT CURRENT TEMPERATURE AND DESIRED TEMPERATURE WHEN THERE IS NO AREA INFORMATION IN RAW DATA UPLOADED FROM DEVICE | 18°C TO 30°C |
| | | MODELING METHOD | IMPORT DATA FOR SPECIFIC PERIOD BASED ON ROOM TEMPERATURE DATA AT THE TIME OF CHANGING DESIRED TEMPERATURE IN TIME ZONE OF 20 TO 06 | DATA FOR EACH DEVICE BASED ON DATA OF ROOM TEMPERATURE, OUTSIDE TEMPERATURE, AND OUTSIDE HUMIDITY AT THE TIME OF CHANGING DESIRED TEMPERATURE FOR TROPICAL NIGHT SOUND SLEEP / NO-WIND TROPICAL NIGHT SOUND SLEEP MODE | |
| RAC (Room Air Conditioner) | 2-Step Cooling | DATA | FIXED VALUE | CURRENT TEMPERATURE, DESIRED TEMPERATURE | 16°C TO 30°C |
| | | MODELING METHOD | 24°C | DATA FOR EACH DEVICE BASED ON ROOM TEMPERATURE AT THE TIME OF CHANGING DESIRED TEMPERATURE | |
| | TROPICAL NIGHT SOUND SLEEP | DATA | FIXED VALUE | CURRENT TEMPERATURE, DESIRED TEMPERATURE | 16°C TO 30°C |
| | | MODELING METHOD | 26°C | DATA FOR EACH DEVICE BASED ON DATA OF ROOM TEMPERATURE AT THE TIME OF CHANGING DESIRED TEMPERATURE FOR TROPICAL NIGHT SOUND SLEEP / NO-WIND TROPICAL NIGHT SOUND SLEEP MODE | |
| | NO-WIND TROPICAL NIGHT SOUND SLEEP | DATA | FIXED VALUE | CURRENT TEMPERATURE, DESIRED TEMPERATURE | 16°C TO 30°C |
| | | MODELING METHOD | 26°C | DATA FOR EACH DEVICE BASED ON ROOM TEMPERATURE AT THE TIME OF CHANGING DESIRED TEMPERATURE FOR TROPICAL NIGHT SOUND SLEEP / NO-WIND TROPICAL NIGHT SOUND SLEEP MODE | |

| CURRENT TEMPERATURE (°C) | SET TEMPERATURE (°C) |
|---|---|
| 30 | 18 |
| 29 | 18 |
| 28 | 18 |
| 28 | 19 |
| 27 | 19 |
| 25 | 19 |
| 23 | 21 |
| 23 | 20 |

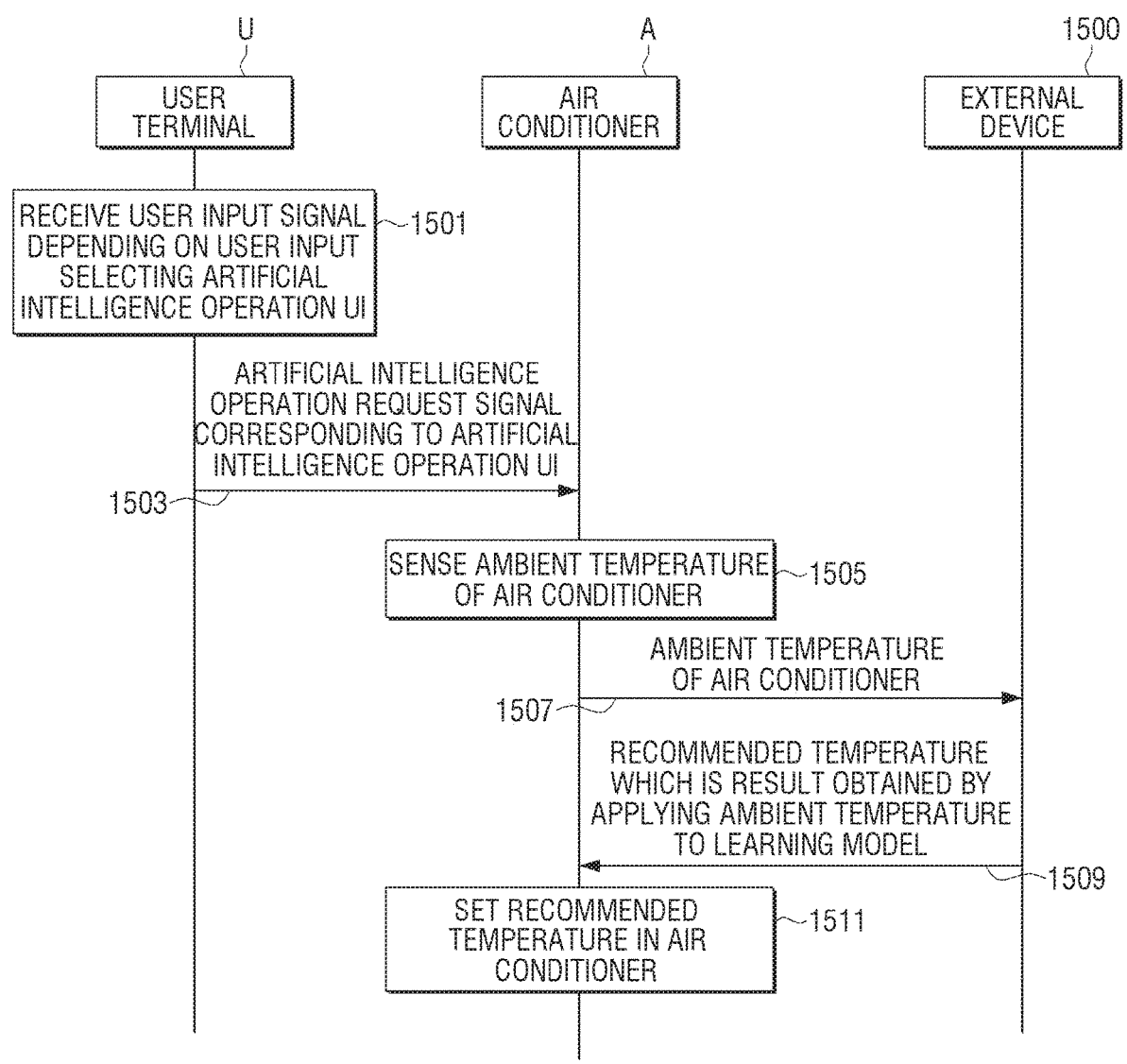

DATA LEARNING SERVER AND METHOD FOR GENERATING AND USING LEARNING MODEL THEREOF

CROSS-REFERENCE TO RELATED APPLICATIONS

This application is based on and claims priority under U.S.C. § 119 of a U.S. Provisional application No. 62/479,207, filed on Mar. 30, 2017 in the U.S. Patent and Trademark Office, and under U.S.C. § 119(a) of a Korean application number 10-2017-0123239, filed on Sep. 25, 2017, in the Korean Intellectual Property Office, the disclosure of which is incorporated herein by reference in its entirety.

TECHNICAL FIELD

The disclosure relates to a method for generating a learning model and a data learning server using the generated learning model.

BACKGROUND

In recent years, intelligent services that automatically recognize data such as voice, image, moving picture and text to provide information related to the data or services related to the data have been used in various fields.

An artificial intelligence technology used in intelligent services is a technology that implements human-level intelligence. Unlike existing rule-based smart systems, the artificial intelligence technology allows machines to perform learning and judgment and become smart of the machine's own accord. As the artificial intelligence technology is used, a recognition rate is getting increased and users' tastes may be understood more accurately, such that the existing rule-based technology is gradually being replaced by the artificial intelligence technology.

The artificial intelligence technique includes machine learning and element technologies that utilize the machine learning.

The machine learning is an algorithm technique that classifies/learns features of input data of its own accord. The element technique is a technique that simulates functions such as recognition and judgment of a human brain using machine learning algorithms and includes technical fields such as linguistic understanding, visual understanding, inference/prediction, knowledge representation, and motion control.

Applications of the artificial intelligence technology are various as follows. The linguistic understanding is a technique for recognizing and applying/processing human language/characters and includes natural language processing, machine translation, dialogue system, query response, speech recognition/synthesis, and the like. The visual understanding is a technique to recognize and process objects like human vision and includes object recognition, object tracking, image search, human recognition, scene understanding, spatial understanding, and image enhancement or the like. The inference prediction is a technique for judging and logically inferring and predicting information and includes knowledge/probability based inference, optimization prediction, preference based planning, recommendation, and the like. The knowledge representation is a technique for automating human experience information into knowledge data and includes knowledge construction (data generation/classification), knowledge management (data utilization), or the like. The motion control is a technique for controlling automatic driving of a vehicle and a motion of a robot, and includes a motion control (navigation, collision, driving), an operation control (behavior control), and the like.

The above information is presented as background information only to assist with an understanding of the disclosure. No determination has been made, and no assertion is made, as to whether any of the above might be applicable as prior art with regard to the disclosure.

SUMMARY

Exemplary embodiments of the disclosure overcome the above disadvantages and other disadvantages not described above. Also, the present invention is not required to overcome the disadvantages described above, and an exemplary embodiment of the disclosure may not overcome any of the problems described above.

The disclosure is to set a temperature of an air conditioner using an artificial intelligence technology.

Accordingly, the disclosure is to provide a method for generating and using a learning model for setting the temperature of the air conditioner.

In addition, the technical subject matters of the disclosure are not limited to the above-described technical matters, and other technical subject matters which are not mentioned may be clearly understood to a person having ordinary skill in the art to which the disclosure pertains from the following description.

In accordance with an aspect of the disclosure, a data learning server is provided. The data learning server includes a communicator configured to communicate with an external device, at least one processor configured to acquire a set temperature set in an air conditioner and a current temperature of the air conditioner at the time of setting the temperature via the communicator, and generate or renew a learning model using the set temperature and the current temperature, and a storage configured to store the generated or renewed learning model to provide a recommended temperature to be set in the air conditioner as the result of generating or renewing the learning model.

In accordance with another aspect of the disclosure, a data learning server is provided. The data learning server includes a storage configured to store a learned learning model to provide a recommended temperature to be set to an air conditioner, at least one processor configured to acquire a current temperature of the air conditioner, and input the current temperature to the learning model to acquire the recommended temperature to be set in the air conditioner, and a communicator configured to transmit the recommended temperature to an external device.

In accordance with another aspect of the disclosure, a network system is provided. The system includes an air conditioner and a learning model server configured to generate a learning model using a learning data acquired from the air conditioner, wherein the air conditioner includes a temperature sensor configured to sense a current temperature around the air conditioner, a blowing fan configured to discharge cooling air to the outside based on the set temperature set in the air conditioner, and an air conditioner communicator configured to communicate with an external device, and at least one air conditioner processor configured to control the air conditioner communicator to transmit the sensed current temperature and the set temperature to the external device, and the learning model server includes at least one server processor acquire the current temperature and the set temperature, and generate a learning model using the acquired set temperature and the current temperature, and a storage configured to store the generated learning model to provide a recommended temperature of the air conditioner as a result of generating the learning model.

In accordance with another aspect of the disclosure, a network system is provided. The network system includes an air conditioner and a learning model server configured to provide a recommended temperature using a recognition data acquired from the air conditioner, wherein the air conditioner includes a temperature sensor configured to sense a current temperature of the air conditioner, a blowing fan configured to discharge cooling air generated from an air purifier to the outside, and an air conditioner communicator transmitting the current temperature to a first external device, wherein the learning model server includes a storage configured to store a learned learning model to provide a recommended temperature of the air conditioner, at least one server processor configured to acquire the current temperature, and input the current temperature to the learning model to acquire the recommended temperature of the air conditioner, and a server communicator configured to transmit the recommended temperature to a second external device.

In accordance with another aspect of the disclosure, an air conditioner is provided. The air conditioner includes a blowing fan configured to discharge cooling air to the outside, a temperature sensor configured to sense a current temperature around the air conditioner, a communicator configured to communicate with an external device, and at least one processor configured to control the communicator to transmit the current temperature to the external device, control the communicator to receive a recommended temperature, which is a result obtained by applying the current temperature to a learning model, from the external device depending on a transmission of the current temperature, and set the received recommended temperature in the air conditioner, wherein the learning model is a learning model learned using a plurality of set temperatures previously set in the air conditioner and a plurality of current temperatures.

In accordance with another aspect of the disclosure, a user terminal is provided. The user terminal includes a display configured to display a screen, a communicator configured to communicate with an external device, an input configured to receive a user input, and at least one processor configured to control the communicator to transmit an artificial intelligence operation request signal corresponding to an artificial intelligence operation UI to the air conditioner in response to a user input signal depending on a user input selecting the artificial intelligence operation UI included in the screen being received via the input, and control the display to display the acquired recommended temperature in response to the recommended temperature set in the air conditioner being acquired, which is a result obtained by applying the current temperature of the air conditioner to the learning model depending on the artificial intelligence operation request signal, via the communicator.

In accordance with another aspect of the disclosure, a method for generating a learning model of a data learning server is provided. The method includes acquiring a set temperature set in an air conditioner and a current temperature of the air conditioner at the time of setting the temperature, generating or renewing a learning model using the set temperature and the current temperature, and storing the generated or renewed learning model to provide a recommended temperature to be set in the air conditioner as the result of generating or renewing the learning model.

In accordance with another aspect of the disclosure, a method for using a learning model of a data learning server is provided. The method includes storing a learned learning model to provide a recommended temperature to be set to an air conditioner, acquiring a current temperature of the air conditioner, inputting the current temperature to the learned learning model to acquire the recommended temperature to be set in the air conditioner, and transmitting the recommended temperature to an external device.

In accordance with another aspect of the disclosure, a method for providing a recommended temperature of an air conditioner is provided. The method includes sensing a current temperature of the air conditioner, transmitting the sensed current temperature to an external device, receiving a recommended temperature, which is a result obtained by applying the current temperature to a learning model, from the external device depending on a transmission of the current temperature, and setting the received recommended temperature in the air conditioner, wherein the learning model is a learning model learned using a plurality of set temperatures previously set in the air conditioner and a plurality of current temperatures.

In accordance with another aspect of the disclosure, a method for controlling an air controller of a user terminal is provided. The method includes receiving a user input signal depending on a user input selecting an artificial intelligence operation UI, transmitting an artificial intelligence operation request signal corresponding to the artificial intelligence operation UI to the air conditioner, acquiring a recommended temperature set in the air conditioner which is a result obtained by applying a current temperature of the air conditioner to a learning model depending on the artificial intelligence operation request signal, and displaying the acquired recommendation temperature on a screen.

In accordance with another aspect of the disclosure, a method for generating a learning model of a network system including an air conditioner and a learning model server is provided. The method includes receiving, by the air conditioner, a user control signal setting a temperature, an operation of transmitting, by the air conditioner, the set temperature and a current temperature of the air conditioner to an external device, generating, by the learning model server, a learning model using the set temperature and the current temperature, and storing, by the learning model server, the generated learning model to provide the recommended temperature of the air conditioner.

In accordance with another aspect of the disclosure, a method for providing a recommended temperature in a network system including an air conditioner and a learning model server is provided. The method includes transmitting, by the air conditioner, a current temperature of the air conditioner to an external device, acquiring, by the learning model server, a recommended temperature of the air conditioner by applying the current temperature to a learning model, and transmitting, by the air conditioner, the recommended temperature to the external device.

In accordance with another aspect of the disclosure, a method for controlling an air conditioner of a network system including an air conditioner and a user terminal is provided. The method includes receiving, by the user terminal, a user input signal depending on a user input selecting an artificial intelligence operation UI, transmitting, by the user terminal, an artificial intelligence operation request signal corresponding to the artificial intelligence operation UI to the air conditioner, transmitting, by the air conditioner, a current temperature of the air conditioner to an external device if the artificial intelligence operation request signal is received, receiving, by the air conditioner, a recommended temperature, which is a result obtained by applying the current temperature to a learning model, from the external device depending on a transmission of the current temperature, and setting, by the air conditioner, the received recommended temperature in the air conditioner, wherein the learning model is a learning model learned using a plurality of set temperatures previously set in the air conditioner and a plurality of current temperatures.

According to an embodiment of the disclosure, as the temperature set in the air conditioner is automatically recommended using the artificial intelligence technology, the convenience of the user who controls the temperature may be greatly improved. In particular, it is possible to provide the user with the most ideal recommended temperature for the user.

Further, according to the method for using a learning model of the disclosure, the learning model may be continuously updated based on the user's temperature setting history which sets the air conditioner and the performance of the learning model may be improved, such that as the learning model according to the disclosure is used, the most ideal recommended temperature may be provided to the user.

That is, the learning model customized to each of the users using the air conditioner may be generated, and thus the optimum recommended temperature suitable for each of the multiple users may be provided.

Further, the effects that may be acquired or expected by various embodiments of the disclosure shall be directly or implicitly disclosed in the detailed description of the disclosure. For example, various effects that may be expected by the various embodiments of the disclosure shall be disclosed in the detailed description to be described below.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWING FIGURES

The above and/or other aspects of the disclosure will be more apparent by describing certain embodiments of the disclosure with reference to the accompanying drawings, in which:

FIGS. 1A and 1B are diagrams showing a network system for generating and using a learning model according to an embodiment of the disclosure;

FIGS. 3A and 3B are flow charts of a network system according to an embodiment of the disclosure;

FIG. 4 is a table showing an example of a generation of a learning model according to an embodiment of the disclosure;

FIG. 15 is a flow chart of a network system including a user terminal and an air conditioner according to an embodiment of the disclosure.

Throughout the drawings, like reference numerals will be understood to refer to like parts, components, and structures.

DETAILED DESCRIPTION

Figure 1A:
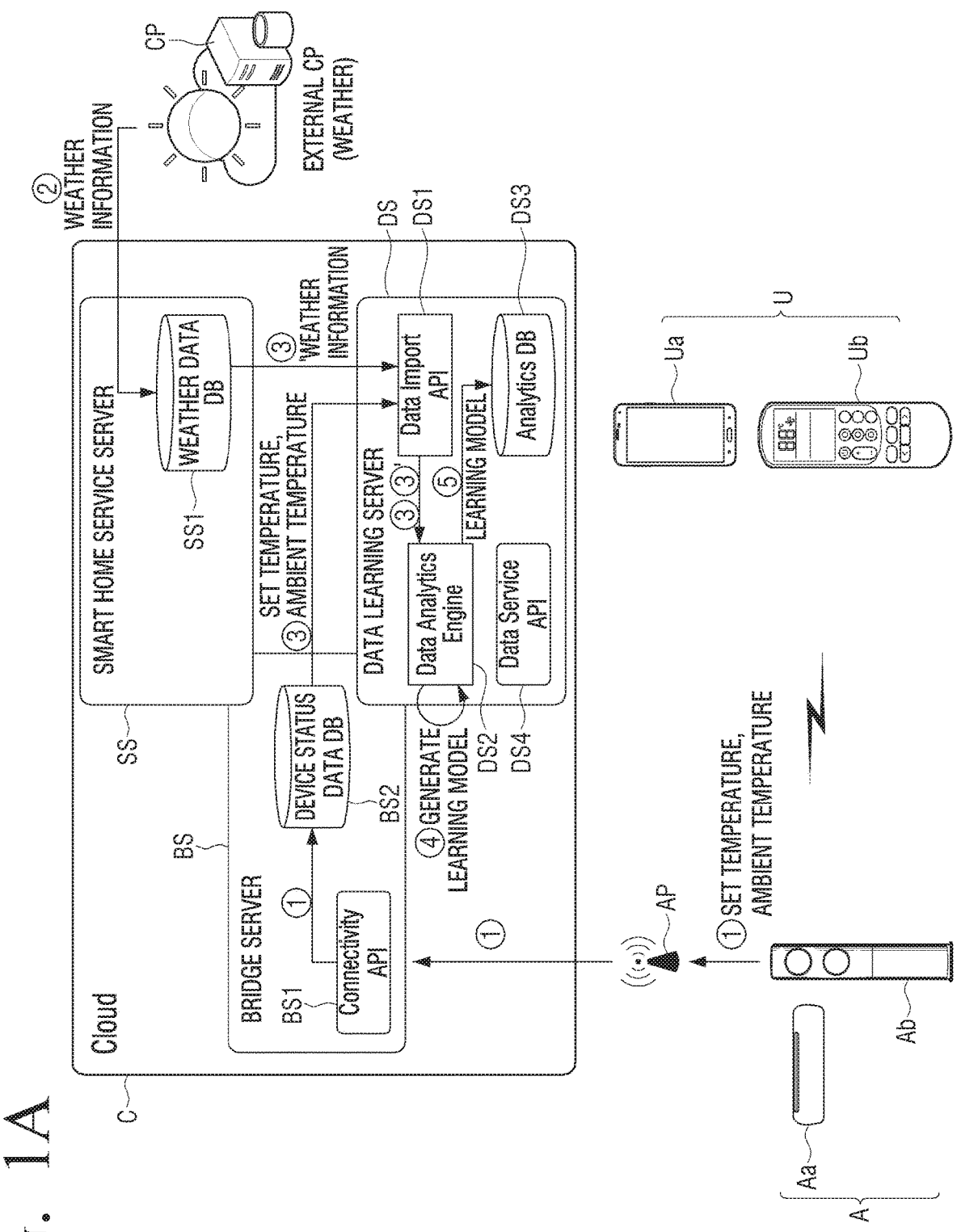

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Hereinabove, the disclosure is described based on an exemplary method. Terms and words used herein are for description and are not limited to the bibliographical meanings, but, are merely used by the inventor to enable a clear and consistent understanding of the disclosure. The disclosure may be variously modified and changed according to the above contents. Therefore, unless additionally mentioned, the disclosure may be freely practiced within a scope of claims.

Various embodiments described in the specification and configurations shown in the drawings are merely preferred examples of the disclosure disclosed, and various modifications which can replace the various embodiments and drawings of the present specification may be present at the time of filing of the present application.

In addition, like reference numerals or symbols of each drawing of the present specification denote parts or components performing substantially the same functions.

In addition, terms used in the present specification are used only in order to describe a specific embodiment rather than limiting the disclosure disclosed. Singular forms used herein are intended to include plural forms unless context explicitly indicates otherwise. Throughout this specification, it will be understood that the term "comprise" and variations thereof, such as "comprising" and "comprises", specify the presence of features, numbers, steps, operations, components, parts, or combinations thereof, described in the specification, but do not preclude the presence or addition of one or more other features, numbers, steps, operations, components, parts, or combinations thereof.

In addition, terms including ordinals such as "first" and "second" used herein may be used to describe various components, but the components are not limited by the terms and the terms are used only for the purpose of distinguishing one component from other components. For example, a 'first' component may be named a 'second' component and the 'second' component may also be similarly named the 'first' component, without departing from the scope of the disclosure. The term 'and/or' includes a combination of a plurality of items or any one of a plurality of terms.

In addition, if any (for example: first) component is "(functionally or communicatively) connected" or "coupled" to another (for example: second) component, the any component may be directly connected to another component or may be connected to the another component via another component (for example: third component).

Hereinafter, various embodiments of the disclosure will be described in detail with reference to the accompanying drawings.

FIGS. 1A and 1B are diagrams showing a network system for generating and using a learning model according to an embodiment of the disclosure.

Referring to FIG. 1A, a network system may include an air conditioner A (Aa or Ab), a user terminal U (Ua or Ub), and a cloud server C. The air conditioner A may be an appliance for controlling a temperature or humidity of an indoor environment. The air conditioner A may be divided into a wall-mounted type like the air conditioner Aa, and a stand type such as the air conditioner Ab.

The user terminal U may be a device for controlling the air conditioner A remotely. Like the user terminal Ua, the user terminal U may be a smart phone, a cellular phone, or a tablet PC in which an air conditioner control application (or app) is installed. Alternatively, like the user terminal Ub, the user terminal U may be a remote controller (or remote control) dedicated to the air conditioner. In addition, the user terminal U may be a smart TV, a digital camera, a personal digital assistant (PDA), a portable multimedia player (PMP), a notebook computer, a desktop computer or the like, but is not limited to the above-mentioned examples.

The user terminal U may control the air conditioner A remotely. For example, the user terminal U may use RF communication technologies such as ZigBee, WIFI, Bluetooth, mobile communications, local area network (LAN), wide area network (WAN), infrared data association (IrDA), UHF, and VHF to transmit a control command to the air conditioner A.

The cloud server C may be connected or directly connected to the air conditioner A via a third device (e.g., an access point (AP), a repeater, a router, a gateway, a hub or the like).

The cloud server C may include one or more server. For example, the cloud server C may include at least one of a bridge server BS, a smart home service server SS, and a data learning server DS. In this case, two or more of the bridge server BS, the smart home service server SS, and the data learning server DS may be integrated into one server. Alternatively, at least one of the bridge server BS, the smart home service server SS, and the data learning server DS may be separated into a plurality of sub-servers.

The bridge server BS (or a device status information import server) may import status information of smart home appliances (for example, an air conditioner, a washing machine, a refrigerator, a cleaner, an oven, or the like).

The bridge server BS may include a connectivity API BS1 and a device status data DB BS2.

The connectivity API BS1 may include an application programming interface (hereinafter, referred to as API) which serves as an interface between different devices operating depending on heterogeneous protocols. The API may be defined as a set of subroutines or functions that may be called from any one protocol for any processing of another protocol. That is, the API may provide the environment in which the operation of another protocol may be performed in any one of the protocols.

The bridge server BS may import the status information of the air conditioner using the connectivity API BS1. Then, the bridge server BS may store the imported status information of the air conditioner in the device status data DB BS2.

The smart home service server SS (or an external environment information import server) may import external environment information. The external environment information may include, for example, at least one of outside temperature and outside humidity as weather information that an external contents server CP (for example, weather station server, weather eye server, or the like) provides.

The data learning server DS may generate a learning model and obtain learning model application results using the learned generation model.

The data learning server DS includes a data import API DS1, a data analytics engine DS2, an analytics DB (DS3), and a data service API (DS4).

FIG. 1A shows a network system in which a data learning server DS generates a learning model, and FIG. 1B shows a network system in which the generated learning model of the data learning server DS is used.

First, a procedure of a network system in which a data learning server DS generates a learning model will be described with reference to FIG. 1A.

In the operation ①, the air conditioner a may transmit the status information (for example, set temperature, current temperature, and the like) of the air conditioner A to the cloud server C via the third device (e.g., an access point AP, a repeater, a router, a gateway, a hub, or the like). The bridge server BS of the cloud server C may import the status information of the air conditioner A, transmitted from the air conditioner A using the connectivity API BS1 and store the imported status information of the air conditioner A in the device status data DB BS2.

The status information of the air conditioner A may include the set temperature set in the air conditioner A and the current temperature (for example, room temperature and ambient temperature) of the air conditioner at the time of setting the temperature, depending on the user's desired temperature.

The user's desired temperature may generally be the same as the set temperature set in the air conditioner A, but may be the set temperature stepwise set by the air conditioner A until the desired temperature is reached.

In addition, the current temperature (or room temperature and ambient temperature) at the time of setting the temperature may include at least one of, for example, temperature sensed by the air conditioner A at a temperature setting time (e.g., time when an operation of a user of setting the temperature of the air conditioner A is performed), temperature sensed by the air conditioner A within a certain time (e.g., 10 minutes) after the temperature setting, and a recent temperature which is sensed in advance before the temperature setting and is being stored.

The status information of the air conditioner A may include the operation mode information set in the air conditioner A. The operation mode may include, for example, a smart comfort mode, a tropical night sound sleep mode, a no-wind tropical night sound sleep mode, a 2-step cooling mode, or the like, but is not limited to the above-described mode.

According various embodiments, time information at the time of setting the temperature of the air conditioner A may be also stored in the device status data DB BS2. The time information at the time of setting a temperature includes, for example, at least one of an operation time of a user who sets a temperature, time when the bridge server BS receives the set temperature, and time when the set temperature is stored in the device status data DB BS2.

According to various embodiments, positional information of the air conditioner A may be also stored in the device status data DB BS2. In this case, the positional information of the air conditioner A may be stored by being received at the time of setting the temperature, or stored in advance.

In operation ②, the smart home service server SS may import external environment information (or weather information) every predetermined period (for example, between 5 minutes and 30 minutes) from the communicating external contents server CP and store the imported external environment information in a weather data DB SS1.

The external environment information may include at least one of an outdoor temperature, an outdoor humidity, a dust concentration, a precipitation, and an amount of sunshine, but is not limited to the above-described example.

In the operations ③ and ③', the data learning server DS may use the data import API DS1 to acquire the status information of the air conditioner A stored in the device status data DB BS2 of the bridge server BS. In addition, the data learning server DS may use the data import API DS1 to acquire the external environment information stored in the weather data DB SS1 of the smart home service server SS.

In this case, the external environment information is external environmental information at the time of setting the temperature of the air conditioner A, and may be information searched from the weather data DB SS1 based on the time information at the time of setting the temperature of the air conditioner A stored in the device status data DB BS2.

Specifically, the external environment information at the time of setting the temperature may include, for example, at least one of external environmental information at time when a user sets a temperature, external environment information in a time zone (for example, morning/day/evening or morning/afternoon) in which a user sets a temperature, and external environment information in month or season when a user sets a temperature.

In addition, the external environment information may be weather information acquired based on the positional information of the air conditioner A. For example, the external environment information may be weather information searched from the weather data DB SS1 based on the positional information of the air conditioner A stored in the device status data DB BS2.

In operation ④, the data analytics engine DS2 of the data learning server DS may generate the learning model using the acquired status information of the air conditioner A and the external environment information as the learning data.

According to various embodiments, the data analytics engine DS2 of the data learning server DS may also generate the learning model using the time information at the time of setting a temperature of the air conditioner A as the learning data.

In addition, the data analytics engine DS2 may also generate a plurality of learning model for each operation mode of the air conditioner A at the time of setting the temperature of the air conditioner A.

For example, the data analytics engine DS2 may generate the learning model available in the smart comfort mode, the learning model available in the tropical night sound sleep mode, the learning model available in the no-wind tropical night sound sleep mode, and the learning model available in the two-step cooling mode, respectively.

In addition, the data learning server DS may be performed in units of, for example, time, day, and month as a modeling period during which the data learning server DS generates the learning model (or updates the learning model) using the learning data, or may be performed at a time of generating an event, but the modeling period is not limited to the above period.

The process for the data learning server DS to generate the learning model will be described later in more detail with reference to FIGS. 4, 5 and 7.

In operation ⑤, the data learning server DS may store the generated learning model in an analytic DB DS3. In this case, the learning model may not be a generic learning model, but may be a learning model configured or constructed to provide the recommended temperature of the air conditioner A.

Referring to FIG. 1B, a procedure of a network system using the learning model generated by the data learning server DS will be described.

In operation ⑥, the air conditioner A may receive a control command requesting an execution (e.g., AI mode ON) of an artificial intelligence function from the user terminal U.

In the operation ⑦, the air conditioner A may transmit the status information (for example, current temperature, operation mode, and the like) of the air conditioner A to the cloud server C via the third device (e.g., an access point AP). The data learning server DS of the cloud server C may acquire the status information of the air conditioner A using the data service API DS4.

In operation ⑧, the data learning server DS may input the acquired status information of the air conditioner A as the learned learning model to provide the recommended temperature of the air conditioner A stored in the analytic DB DS3.

In operation ⑨, the data learning server DS may acquire the recommended temperature of the air conditioner A as a result of applying the learning model.

In operation ⑩, the data learning server DS may transmit the acquired recommended temperature of the air conditioner A to the air conditioner A via the third device (for example, the access point AP). Further, in step ⑩', the data learning server DS may transmit the acquired recommended temperature of the air conditioner A to the user terminal U.

In operation ⑪, the air conditioner A which has received the recommended temperature may set the temperature of the air conditioner A as be the received recommended temperature.

In addition, in operation ⑫, the user terminal U having received the recommended temperature may display the received recommended temperature so that the user may confirm the received recommended temperature. Alternatively, as in the operation ⑫', the user terminal U having received the recommended temperature may display visual information indicating that the preferred recommended temperature is adopted in comparison with the set temperature history predetermined by the user.

Figure 2A:
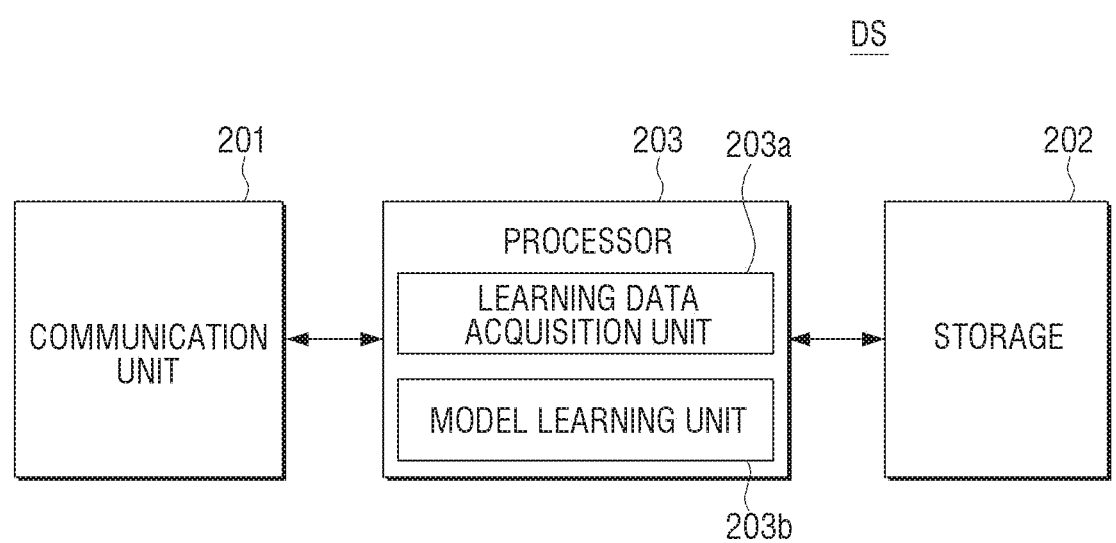
FIGS. 2A and 2B are diagrams showing a configuration of a data learning server according to an embodiment of the disclosure.
Figure 2B:
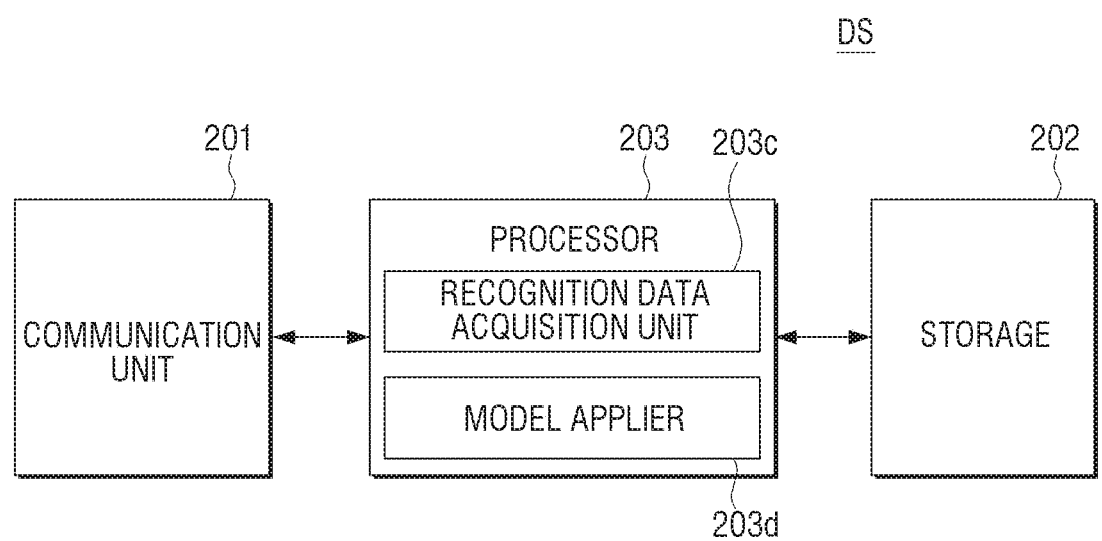

FIGS. 2A and 2B are diagrams showing a configuration of a data learning server according to an embodiment of the disclosure.

The data learning server DS of FIG. 2A is a functional block diagram for generating a learning model, and the data learning server DS of FIG. 2B is a functional block diagram using the generated learning model.

In FIGS. 2A and 2B, the data learning server DS may include a communication unit 201, a storage 202, and a processor 203.

The communication unit 201 may perform communication with an external device.

The external device may include at least one of the external server (e.g., a bridge server, a smart home service server, or the like) and the air conditioner A.

The communication unit 201 may perform communication with the external device in a wired or wireless communication manner. The wireless communication may include, for example, cellular communication, near field communication, or global navigation satellite system (GNSS) communication. The cellular communication may include, for example, long-term evolution (LTE), LTE-advance (LTE-A), code division multiple access (CDMA), wideband CDMA (WCDMA), universal mobile telecommunication system (UMTS), wireless broadband (WiBro), global system for mobile communications (GSM), or the like. The near field communication may include, for example, wireless fidelity (WiFi), WiFi direct, light fidelity (LiFi), Bluetooth, Bluetooth low energy (BLE), Zigbee, near field communication (NFC), magnetic secure transmission, radio frequency (RF), and body area network (BAN). The communication unit 201 may also be referred to as a communicator.

The data learning server DS may include the storage 202. The storage 202 may store the learning model generated by the data learning server DS.

The storage 202 may include a volatile and/or non-volatile memory. The volatile memory may include, for example, a random access memory (RAM) (e.g., DRAM, SRAM, or SDRAM). The non-volatile memory may include, for example, a one-time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard drive, or a solid status drive (SSD).

The processor 203 may include one or more of a central processing unit, an application processor, a graphic processing unit (GPU), a camera image signal processor, and a communication processor (CP). According to an embodiment, the processor 203 may be implemented as a system on chip (SoC) or a system in package (SiP). The processor 203 may drive, for example, an operating system or an application program to control at least one other component (e.g., hardware or software component) of the data learning server (DS) connected to the processor 203 and may perform various data processing and operations. The processor 203 may load a command or data received from other components (e.g., communication unit 201) in the volatile memory and process the loaded command or data and may store the result data in the non-volatile memory.

FIGS. 2A and 2B are diagrams showing the configuration of a data learning server according to the embodiment of the disclosure.

The data learning server DS of FIG. 2A is a functional block diagram for generating a learning model, and the data learning server DS of FIG. 2B is a functional block diagram using the generated learning model.

Referring to FIGS. 2A and 2B, the data learning server DS may include the communication unit 201, the storage 202, and the processor 203.

The communication unit 201 may perform communication with the external device.

The external device may include at least one of the external server (e.g., a bridge server, a smart home service server, or the like) and the air conditioner A.

The communication unit 201 may perform communication with the external device in a wired or wireless communication manner. The wireless communication may include, for example, the cellular communication, the near field communication, or the global navigation satellite system (GNSS) communication. The cellular communication unit may include, for example, long-term evolution (LTE), LTE-advance (LTE-A), code division multiple access (CDMA), wideband CDMA (WCDMA), universal mobile telecommunication system (UMTS), wireless broadband (WiBro), global system for mobile communications (GSM), or the like. The near field communication may include, for example, wireless fidelity (WiFi), WiFi direct, light fidelity (LiFi), Bluetooth, Bluetooth low energy (BLE), Zigbee, near field communication (NFC), magnetic secure transmission, radio frequency (RF), and body area network (BAN).

The data learning server DS may include the storage 202. The storage 202 may store the learning model generated by the data learning server DS.

The storage 202 may include the volatile or non-volatile memory. The volatile memory may include, for example, a random access memory (RAM) (e.g., DRAM, SRAM, or SDRAM). The nonvolatile memory may include, for example, a one-time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard drive, or a solid status drive (SSD).

The processor 203 may include one or more of a central processing unit, an application processor, a graphic processing unit (GPU), a camera image signal processor, and a communication processor (CP). According to an embodiment, the processor 203 may be implemented as a system on chip (SoC) or a system in package (SiP). The processor 203 may drive, for example, an operating system or an application program to control at least one other component (e.g., hardware or software component) of the data learning server (DS) connected to the processor 203 and may perform various data processing and operations. The processor 203 may load a command or data received from other components (e.g., communication unit 201) in the volatile memory and process the loaded command or data and may store the result data in the non-volatile memory.

The processor 203 of FIG. 2A may be described as a functional block diagram for generating a learning model.

In FIG. 2A, the processor 203 may include a learning data acquisition unit 203a and a model learning unit 203b.

The learning data acquisition unit 203a may acquire the set temperature set in the air conditioner A and the current temperature of the air conditioner A at the time of setting the temperature through the communication unit 201. For example, the learning data acquisition unit 203a may acquire the set temperature and the current temperature from the bridge server BS communicatively connected to the air conditioner A. Alternatively, the learning data acquisition unit 203a may also acquire the set temperature and the current temperature from the air conditioner A or the third device communicatively connected to the air conditioner A.

In addition, the learning data acquisition unit 203a may further acquire the external environment information through the communication unit 201. The external environment information may include at least one of an outside temperature and an outside humidity. For example, the learning data acquisition unit 203a may acquire the external environment information from the smart home service server SS communicatively connected to an external contents providing server CP.

The model learning unit 203b may generate or update the learning model using the acquired set temperature and current temperature. When the learning data acquisition unit 203a further acquires the external environment information, the model learning unit 203b may generate or update the learning model using the set temperature, the current temperature, and the external environment information. In addition, when the learning data acquisition unit 203a further acquires the time information at the time of setting the temperature of the air conditioner A, the model learning unit 203b may generate or update the learning model using the set temperature, the current temperature, and the time information.

The storage 202 may store the learned learning model to provide the recommended temperature to be set in the air conditioner A as the generation or update result of the learning model.

On the other hand, when the model learning unit 203b generates or updates a plurality of learning models for each operation mode of the air conditioner A, the storage 202 may store a plurality of learning models, respectively.

The processor 203 of FIG. 2B may be described as the functional block diagram for using the learning model.

In FIG. 2B, the processor 203 may include a recognition data acquisition unit 203c and a model applier 203d. In this case, the storage 202 may store the learned learning model to provide the recommended temperature to be set in the air conditioner A.

In FIG. 2B, the recognition data acquisition unit 203c may acquire the current temperature of the air conditioner A.

The model applier 203d may input the acquired current temperature to the learning model of the storage 202 and acquire the recommended temperature to be set in the air conditioner A.

When the recognition data acquisition unit 203c further acquires the external environment information, the model applier 203d may input the current temperature and external environment information to the learning model to acquire the recommended temperature to be set in the air conditioner A.

In addition, when the storage 202 stores a plurality of learning models for each operation mode of the air conditioner A, the model applier 203d may set the current temperature to the learning model corresponding to the current operation mode of the air conditioner A to acquire the recommenced temperature of the air conditioner A.

The communication unit 201 may transmit the acquired recommended temperature to the external device. The external device may be, for example, the air conditioner A or a third device communicatively connected to the air conditioner A.

Figure 3B:
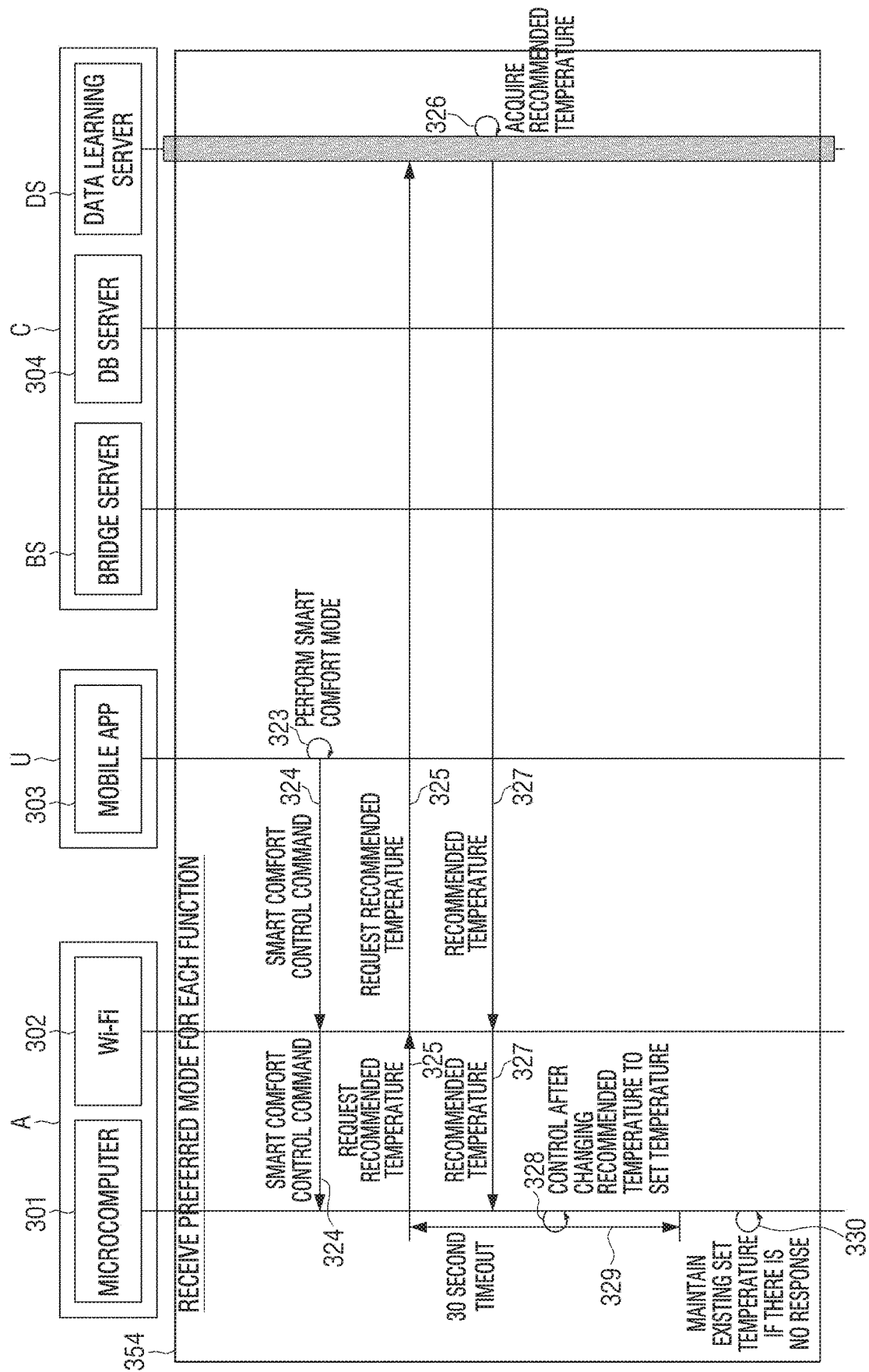

FIGS. 3A and 3B are flow charts of a network system according to an embodiment of the disclosure.

The flow chart of the network system shows a data flow procedure between the air conditioner A, the user terminal U and the cloud server C.

Referring to FIGS. 3A and 3B, the flow chart of the network system may include a data importing procedure 351 of importing the learning data, a procedure 352 of generating a data model based on the learning data, a procedure 353 of operating the artificial intelligence function, and a procedure 354 of setting preferred modes for each function.

In FIG. 3A, the air conditioner A may include a microcomputer 301 and a near field communication module (e.g., Wi-Fi module) 302. The microcomputer 301 corresponds to the processor 203 of FIGS. 2A and 2B, and the near field communication module 302 may correspond to the communication unit 201 of FIGS. 2A and 2B. The air conditioner A may communicate with the user terminal U and the cloud server C via the network using the near field communication module 302. In addition, the air conditioner A may receive the recommended temperature recommended by the cloud server C via the API call related to the near field communication module 302 and set the temperature of the air conditioner A depending on the recommended temperature.

The user terminal U may include a mobile app (or mobile application) 303. The mobile app 303 may set the artificial intelligence function and the operation mode of the air conditioner A and perform a function of displaying the recommended temperature provided by the cloud server C on the user terminal U.

The cloud server C may include the bridge server BS, the DB server (304), and the data learning server DS. The DB server 304 may be a part of the bridge server BS or a third server physically separated from the bridge server BS.

First, at operation 311, the user terminal U may receive user input to change (or set) the desired temperature via the mobile app 303. The mobile app 303 may be, for example, an app providing a user interface for controlling the air conditioner A.

In operation 312, depending on the input of the user, the user terminal U may transmit a control command to the microcomputer 301 via the near field communication module 302 to set the air conditioner A to be the desired temperature.

Alternatively, at operation 311', the user may change the desired temperature via the remote control device Ub. In operation 312', the remote control device Ub may transmit the control command for setting the air conditioner A to be the desired temperature to the microcomputer 301 according to the change input of the user.

In operation 313, the microcomputer 301 of the air conditioner A may generate a desired temperature change event in response to the desired temperature change request of the user and transmit the generated desired temperature change event to the bridge server BS via the near field communication module 302. At this time, the desired temperature change event may include event data. The event data may include, for example, the status information of the air conditioner A. The status information of the air conditioner A may include a desired temperature (or set temperature) and a current temperature at the time of setting the desired temperature.

In addition, the event data may include, for example, the operation mode information and the time information of the air conditioner A. The operation mode information may include, for example, information indicating the operation mode of the air conditioner A at the time of receiving the control command of the user or the operation mode of the air conditioner A at the time of generating the desired temperature change event. The time information may include, for example, the information on the time when the user receives the control command or the information on the time when the desired temperature change event is generated.

In operation 314, the bridge server BS may transmit the event data to the DB server 304. In operation 315, the DB server 304 may store the received event data.

In operation 316, the DB server 304 may transmit the stored event data to the data learning server DS at regular periods. For example, the DB server 304 may transmit event data daily in a daily batch file form. At this time, the daily batch file may include a plurality of event data. For example, when the desired temperature change request of the user is generated plural times a day, the plurality of event data may be generated, which is in turn stored in the DB server 304. The plurality of generated event data may be transmitted to the data learning server DS by being included in the daily batch file.

In operation 317, the data learning server DS may generate the learning model using the received event data as the learning data. For example, the data learning server DS may generate the learning model using at least one of the set temperature of the air conditioner A, the current temperature, the external environment information, the operation mode information, and the time information.

In the situation where the learning model has been generated, as in operation 318, the user terminal U may receive a user input that turns on the artificial intelligence function of the air conditioner A. Partial screen 318a shows a part of a screen of the user terminal U including the user interface for turning on the artificial intelligence function. In the partial screen 318a, the user terminal U may receive a user input that selects an 'AI customized operation' execution object 318b to turn on the AI function.

In operation 319, depending on the user's input, the user terminal U may transmit an artificial intelligence function activation command to the microcomputer 301 via the near field communication module 302 to turn on the AI function of the air conditioner A.

Based on the artificial intelligence function activation command, the microcomputer 301 may transmit the device status information indicating that the artificial intelligence function of the air conditioner A is activated to the user terminal U via the near field communication module 302 as in the operation 320. In this case, the status information of the air conditioner A may be transmitted by being included in a notification event.

Alternatively, as in the operation 321, the user terminal U may transmit a device information request command requesting the status information of the air conditioner A to the microcomputer 301 via the near field communication module 302. The device information request command may be transmitted by being included in, for example, 'GET DEVICE' message.

Based on the device information request command, the microcomputer 301 may transmit the device information response to the user terminal U via the near field communication module 302 as in operation 322. In this case, the device information response may include the artificial intelligence setting information indicating that the artificial intelligence function of the air conditioner A is set to be turned on as the status information of the air conditioner A.

That is, by considering the situation where there are the plurality of user terminals U for controlling the artificial intelligence function of the air conditioner A, the air conditioner A may notify the user terminal U of whether the artificial intelligence function of the air conditioner A is activated periodically or upon the generation of the event.

As such, when the artificial intelligence function of the air conditioner A is activated, the user terminal U may receive the user input for setting the operation mode.

Referring to FIG. 3B, in operation 323, the user terminal U may receive the user input requesting the execution of the smart comfort mode.

In operation 324, depending on the input of the user, the user terminal U may transmit the smart comfort control command to the microcomputer 301 via the near field communication module 302 to execute the smart comfort mode of the air conditioner A.

Based on the smart comfort control command, the microcomputer 301 may transmit the recommended temperature (or preferred temperature) request command to the data learning server DS via the near field communication module 302, as in operation 325. At this time, the recommended temperature request command may include, for example, the current temperature of the air conditioner A as the status information of the air conditioner A. Alternatively, the recommended temperature request command may further include at least one of the operation mode information indicating the current operation mode and the positional information of the air conditioner A.

In operation 326, the data learning server DS may acquire the recommended temperature of the air conditioner A as the result of applying the learning model of the status information of the air conditioner A. That is, the data learning server DS may input the status information of the air conditioner A to the learning model stored in the data learning server DS to acquire the recommended temperature of the air conditioner A.

In this case, the data learning server DS may apply the status information of the air conditioner A to the learning model corresponding to the operation mode of the air conditioner A, based on the operation mode information of the air conditioner A to acquire the recommended temperature of the air conditioner A. In the embodiment, the data learning server DS may acquire the recommended temperature of the air conditioner A by applying the status information of the air conditioner A to the learning model corresponding to the smart comfort mode.

Once the recommended temperature is acquired, in operation 327, the data learning server DS may transmit the acquired recommended temperature to the microcomputer 301 via the near field communication module 302.

In operation 328, the microcomputer 301 receiving the recommended temperature may change the recommended temperature to the set temperature. Then, the microcomputer 301 may control the air conditioner A depending on the changed set temperature.

On the other hand, if there is no response from the data learning server DS for a predetermined time (e.g., 30 seconds) 329 after the microcomputer 301 requests the recommended temperature to the data learning server DS, in operation 330, the microcomputer 301 may maintain the existing set temperature. The existing set temperature may be, for example, a predetermined temperature before the user input for requesting the execution of the smart comfort mode, the predetermined temperature corresponding to the current operation mode (e.g., smart comfort mode) or the like.

FIG. 4 is a table showing an example of a generation of a learning model according to an embodiment of the disclosure.

Referring to FIG. 4, the data learning server DS may perform a learning procedure 404 using different learning data 403 depending on a type 401 of the air conditioner A and a mode 402 of the air conditioner A. For example, the type 401 of the air conditioner A may include a floor air conditioner (FAC) type (or stand type air conditioner) and a room air conditioner (wall-mounted type air conditioner) (RAC) type. In this case, the data learning server DS may generate the learning models corresponding to each of the smart comfort mode, the tropical night sound sleep mode, and the no-wind tropical night sound sleep mode as the operation mode of the floor air conditioner. In addition, the data learning server DS may generate the learning models corresponding to each of the 2-step cooling mode, the tropical night sound sleep mode, and the no-wind tropical night sound sleep mode as the operation mode of the room air conditioner.

If each learning model according to the learning procedure 404 considering the type 401 of the air conditioner A and the mode 402 of the air conditioner A is generated, the data learning server DS may use the learning model to acquire the recommended temperature. In this case, the recommended temperature may be acquired in consideration of a setting range 405 for each operation mode. For example, when the recommended temperature acquired by the data learning server DS is out of the setting range 405, the temperature in the setting range 405 closest to the recommended temperature may be determined as the final recommended temperature.

Describing an example of the procedure of generating the learning model in the smart comfort mode 411 with reference to FIG. 4, the indoor temperature (or current temperature) and the desired temperature (or set temperature) may be used. In this case, the room temperature may be a room temperature measured at the time of changing the desired temperature. In addition, as the learning data, data imported during a specific period of time may be used. The specific time period may be, for example, data imported in a specific year, a specific month, or a specific season. The specific data may be data imported based on the temperature setting history information of the air conditioner of the unspecified users who use the same or similar products as the air conditioner A as well as the user of the air conditioner A. At this time, the unspecified users may be limited to, for example, a user in the same or similar area or the same or similar environment as the air conditioner A.

In the smart comfort mode 411, the data learning server DS may use the current temperature (or room temperature), the outside temperature, the outside humidity, and the desired temperature as the learning data.

In addition, the data learning server DS may use the external environment information based on the local information of the air conditioner A as the learning data. On the other hand, when the data learning server DS may not confirm the local information of the air conditioner A, the data learning server may generate, learn, and renew the learning model using the current temperature and the desired temperature as the learning data.

The data learning server DS may acquire the recommended temperature to be set in the air conditioner A by using the generated, learned, and renewed learning models.

In this case, if the acquired recommended temperature is out of the setting range of 22° C. to 26° C., the data learning server DS may determine the final recommended temperature in consideration of the setting range.

For example, if the recommended temperature acquired using the learning model is less than 22° C., the data learning server DS may determine the recommended temperature to be 22° C. In addition, if the recommended temperature acquired using the learning model is higher than or equal to 26° C., the data learning server DS may determine the recommended temperature to be 26° C.

According to various embodiments, when generating the learning model, the data learning server DS may further assign a weight to learning data recently imported to generate the learning model.

Figure 5:
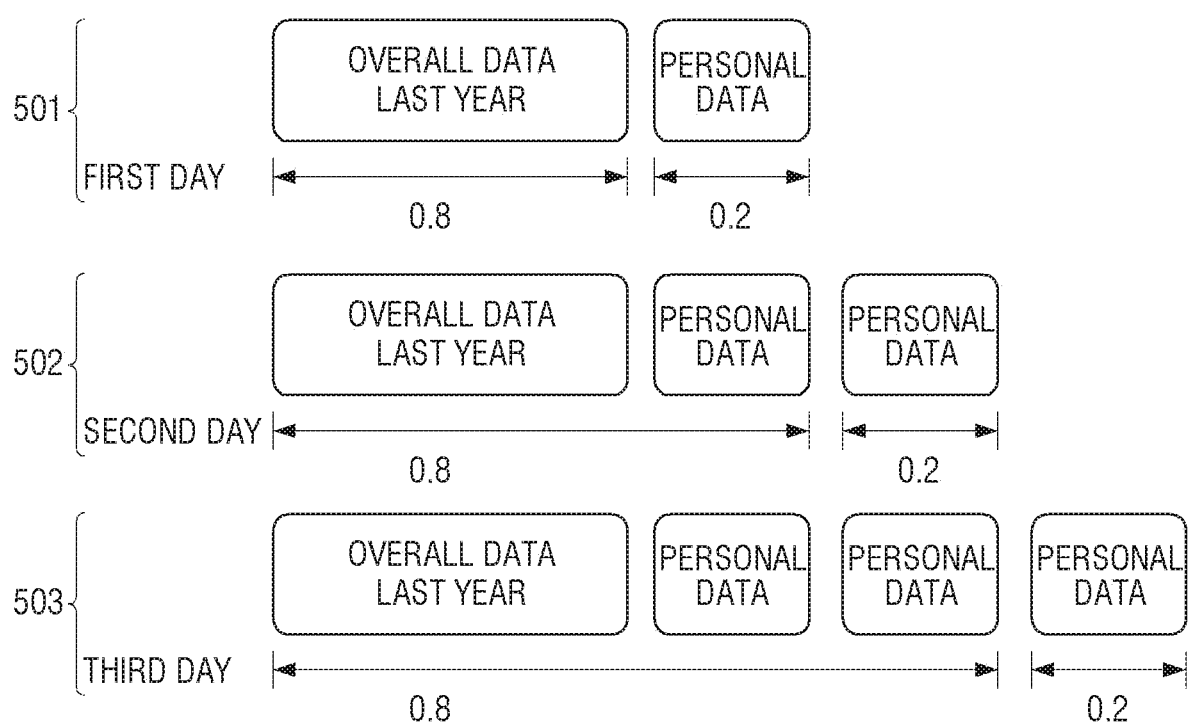
FIG. 5 is a diagram showing an example of imparting a weight to a learning data according to an embodiment of the disclosure.

FIG. 5 is a diagram showing an example of imparting a weight to a learning data according to an embodiment of the disclosure.

Referring to FIG. 5, the data learning server DS may differently assign weights to the learning data imported for 1 day, 2 days, and 3 days, respectively, like 501, 502, and 503 in FIG. 5.

For example, in 501 of FIG. 5, the data learning server DS may assign a weight of 0.8 to all data (e.g., data imported from unspecified users) of the past year, and assign a weight of 0.2 to user's personal data (user's desired temperature and current temperature, or the like) of the air conditioner A which is imported on the first day. Similarly, in 502 of FIG. 5, the data learning server DS may assign a weight of 0.8 to all data of the past year and the user's personal data of the air conditioner A which is imported on the first day, and a weight of 0.2 to the user's personal data of the air conditioner A which is imported on the second day. In addition, in 503 of FIG. 5, the data learning server DS may assign a weight of 0.8 to all data of the past year and the user's personal data of the air conditioner A which is imported on the first day and the second day, and a weight of 0.2 to the user's personal data which is imported on the third day.

On the other hand, the above-mentioned weight value is only an example, and the data learning server DS may be preset to be different values by a manufacturer, a manager, an operating system, an application provider or the like of the data learning server DS. For example, in FIG. 5, instead of a weight of 0.8 and a weight of 0.2, a weight of 0.9 and a weight of 0.1 each may be used. As another example, in FIG. 5, instead of a weight of 0.8 and a weight of 0.2, a weight of 0.7 and a weight of 0.3 each may be used.

On the other hand, the above-mentioned weight may be a variable type which is changed depending on the situation rather than a predetermined fixed type.

In this case, the weight may be manually changed by the administrator of the data learning server DS, the user of the air conditioner or the like, or may be automatically changed depending on the specific condition. For example, as a total amount of imported learning data is increased, the weight of the most recently imported personal data may also be increased accordingly.

Figure 6:
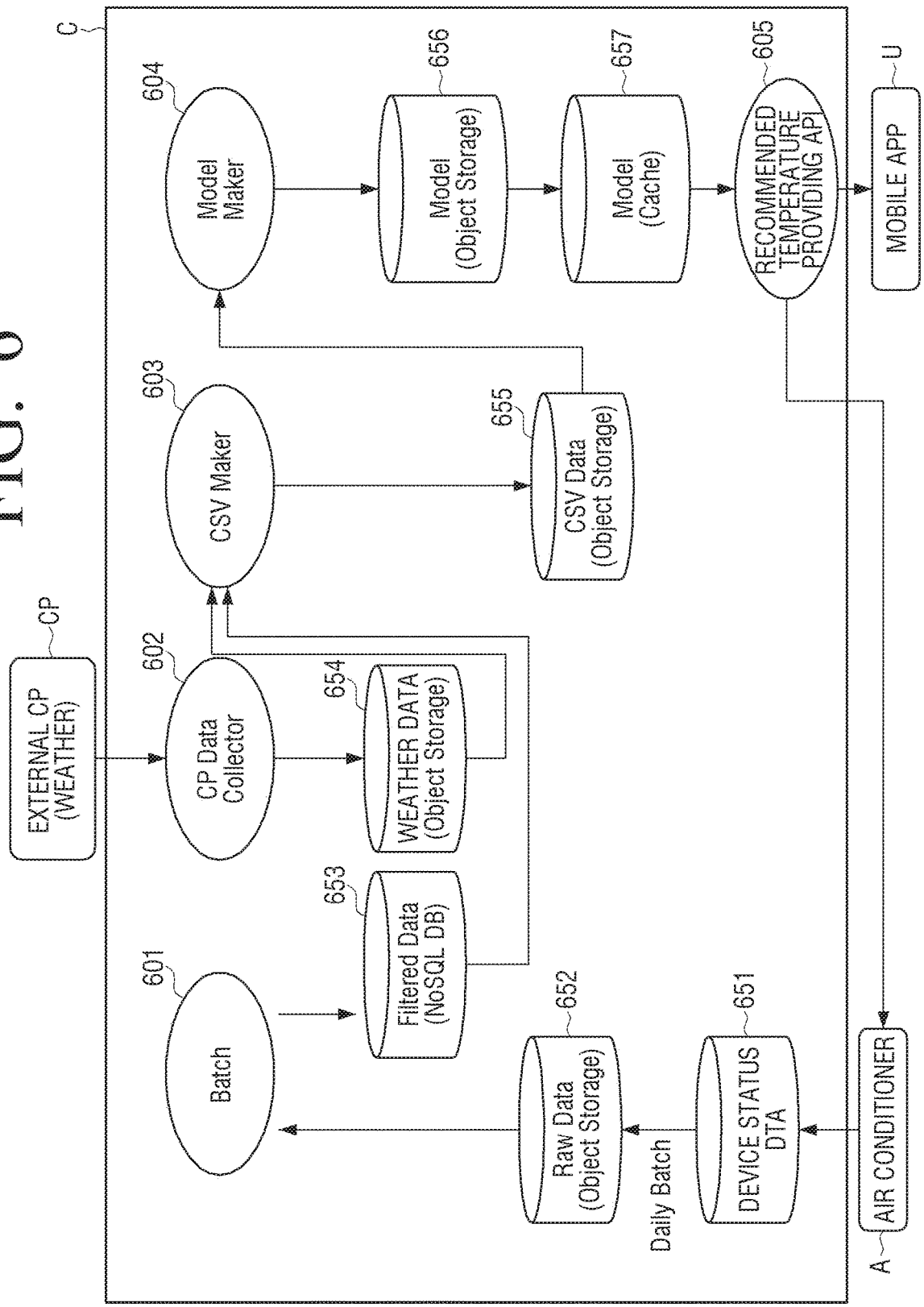
FIG. 6 is a diagram showing a structure of a cloud server according to an embodiment of the disclosure.

FIG. 6 is a diagram showing a structure of a cloud server according to an embodiment of the disclosure.

The cloud server C may include a batcher 601, a contents provider (CP) data collector 602, a CSV maker 603, a model maker 604, and a learning temperature providing server API 605. Components 601 to 604 of the cloud server C described above use and process the data stored in the storage (or, database) of the cloud server C to generate the recommended temperature suitable for the air conditioner A.

First, the cloud server C may store, in a device status storage 651, the device status data including the status information of the air conditioner A acquired depending on the generation of the status change event of the air conditioner A. The device status storage 651 may correspond to the device status data DB BS2 of FIGS. 1A and 1B, for example. The cloud server C may acquire the status information stored in the device status storage 651 every predetermined period (e.g., every day), and stores raw data generated depending on a certain criterion (e.g., by date) in an object storage 652.

The batcher 601 of the cloud server C may acquire and filter the row data in the object storage 652 and store the filtered data in a distributed environment data DB (e.g., Not Only SQL DB, NoSQL DB) 653. The filtered data may be, for example, data including the device status data of the air conditioner A or the status information extracted from meta data.

In addition, the CP data collector 602 may store weather data including weather information imported from the external content server CP in an object storage 654.

The CSV maker 603 of the cloud server C refines the data acquired from the object distributed environment data DB 653 and the object storage 654 to generate data of a specific format (e.g., CSV format) suitable for the generation of the learning model and store the generated data in the object storage 655.

The model maker 604 may acquire data of a specific format from the object storage 655, generate the learning model using the data, and store the generated learning model in the object storage 656.

The cloud server C may temporarily store the learning model stored in the object storage 655 in a cache 657 which is a high-speed storing memory when the use of the learning model is required.

Under the situation in which the use of the learning model is required, the recommended temperature providing API 605 of the cloud server C may acquire the recommended temperature of the air conditioner A by using the learning model stored in the cache 657.

The cloud server C may transmit the recommended temperature acquired through the acquired recommended temperature providing API 605 to the mobile apps of the air conditioner A and the user terminal U.

Meanwhile, in FIG. 6, for convenience of explanation, object storages 652, 654, 655, and 656 are denoted by different reference numerals, but the object storages 652, 654, 655, and 656 may denote the same object storage or may mean two or more distributed object storages.

Figures 7A, 7B:
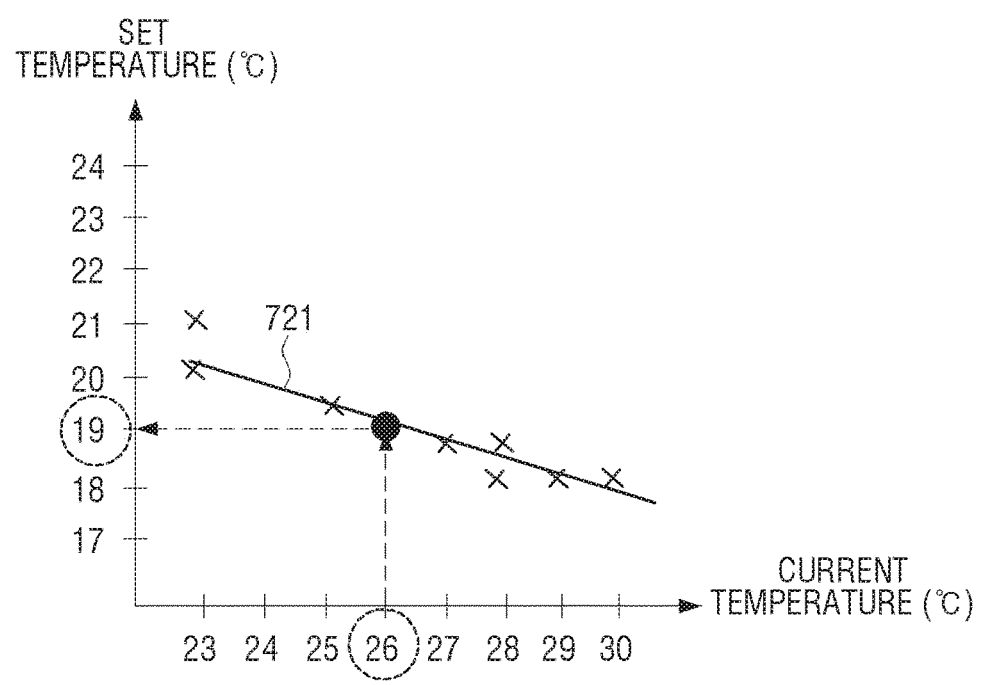
FIGS. 7A and 7B are diagrams showing a procedure of generating a learning model according to an embodiment of the disclosure.

FIGS. 7A and 7B are diagrams showing a procedure of generating a learning model according to an embodiment of the disclosure.

The learning model may be generated using the artificial intelligence algorithm. For example, the learning model may be generated using a decision tree algorithm, a support vector machine algorithm, a linear discrimination analysis algorithm, a genetic algorithm, or a neural network algorithm that simulates neurons in a human neural network. The neural network algorithm may include a plurality of network nodes having weights. The plurality of network nodes may each establish a connection relationship so that neurons simulate synaptic activity of transmitting and receiving signals through synapses. Also, the learning model may be generated using a deep learning algorithm developed in the neural network algorithm. In the deep learning algorithm, the plurality of network nodes may transmit and receive data depending on the convolution connection relationship while being located at different depths (or layers). The learning model may include models such as deep neural network (DNN), a recurrent neural network (RNN), and a bidirectional recurrent deep neural network (BRDNN) may be provided, but is not limited to the above-mentioned example.

For convenience of description, the disclosure describes a method for providing a recommended temperature using a linear regression as an algorithm used for the generation of the learning model.

The data learning server DS may derive the learning model such as the following Equation 1 according to the linear regression algorithm $$y=a_0+a_1x_1+a_2x_2+a_3x_3 \qquad \text{Equation 1}$$

In the above Equation 1, y is a variable related to the set temperature set in the air conditioner A, and $a_0$, $a_1$, $a_2$, and $a_3$ are constant values. In addition, $x_1$ is a variable related to the current temperature, $x_2$ is a variable related to the outdoor temperature, and $x_3$ is a variable related to the outdoor humidity.

In order to facilitate understanding, the learning model in the case in which the number of learning variables (or learning elements) in the above Equation 1 is two is expressed by the following Equation 2.

$$y=a_0+a_1x_1 \qquad \text{Equation 2}$$

In this case, the table of FIG. 7A shows the set temperature (e.g., user's setting temperature) 712 depending on the current temperature (or, ambient temperature, room temperature) 711 of the air conditioner.

Based on the linear regression algorithm, the data learning server DS may derive a learning model which is a calculation expression that expresses the relationship of the set temperature 712 depending on the current temperature 711. This is shown in a graph as shown in FIG. 7B.

Referring to FIG. 7B, the current temperature 711 and the set temperature 712 in FIG. 7A may correspond to mark 'X' on the graph when they are plotted on x and y axes.

In this case, a linear regression line 721 using a linear regression algorithm may be acquired so that a sum of errors of the plurality of 'X' markers is small. That is, in the above Equation 2, the constant values $a_0$ and $a_1$ having the smallest difference between the set temperature 712 of the air conditioner A and the predicted temperature may be calculated.

An example of the linear regression model that reflects the calculated constant value is as follows.

$$y=29.91840623+(-0.3717125)x_1 \qquad \text{Equation 3}$$

Accordingly, the data learning model DS may provide the air conditioner A with the recommended temperature according to the recommended temperature request command of the air conditioner A based on the following Equation 3.

For example, when the current room temperature around the air conditioner A is 26° C., the recommended temperature provided by using the learning model of the above Equation 3 may be 19° C.

According to various embodiments, the learning model may be continuously renewed (or updated).

To this end, the data learning server DS may further include a model renewer (not shown). The model renewer may determine whether the learning model is renewed analyzing the relevance between the basic learning data used in the learning model that has been constructed in advance and the newly inputted learning data. At this time, the relevance may be determined based on the area and time in which the learning data is generated, the time, the model of the air conditioner that provides the learning data, and the like.

For example, the model renewer may continuously renew the already constructed learning model by using the user's temperature setting history for setting the temperature of the air conditioner A, the user's change history for the recommended temperature, or the like as the learning data.

According to various embodiments, the learning model may be stored in the storage of the air conditioner A, not in a separate server. In this case, the learning model constructed in the data learning server DS may be transmitted to the air conditioner A periodically or upon the generation of the event.

When the learning model is provided in the air conditioner A, the air conditioner A may acquire the recommended temperature using the stored learning model. For example, the air conditioner A may acquire the recommended temperature by inputting the sensed current temperature to the learning model. In this case, the air conditioner A may acquire the recommended temperature using the sensed current temperature without user intervention, and may automatically set the temperature of the air conditioner A depending on the recommended temperature.

Figure 8:
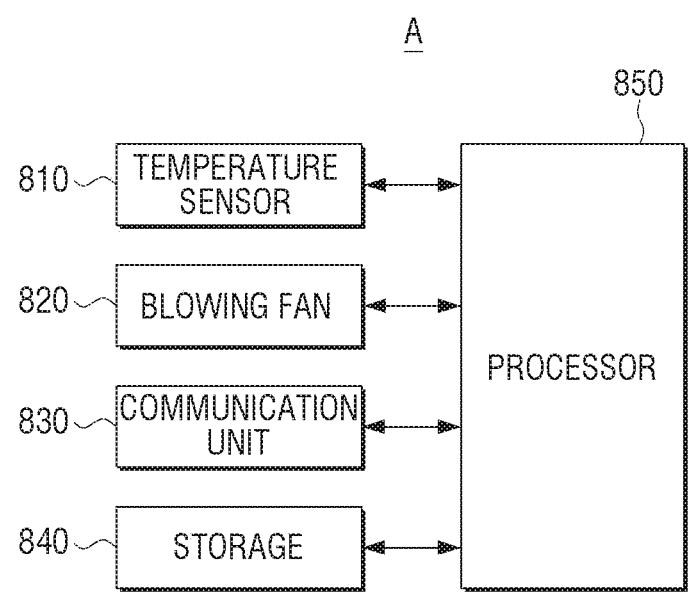
FIG. 8 is a block diagram showing a configuration of an air conditioner according to an embodiment of the disclosure.

FIG. 8 is a block diagram showing a configuration of an air conditioner according to the embodiment of the disclosure.

Referring to FIG. 8, the air conditioner A may include a temperature sensor 810, a blowing fan 820, a communication unit 830, a storage 840, and a processor 850. In various embodiments, the air conditioner A may omit at least one of the components described above, or may additionally include other components.

The temperature sensor 810 may sense the temperature of the room around the air conditioner A.

The blowing fan 820 may discharge cooling air to the outside through an opening/closing portion (not shown). Alternatively, in the no-wind mode, the blowing fan 820 can discharge cooling air to the outside through a plurality of micro-holes (not shown) at a predetermined flow rate or less. At this time, the predetermined flow rate may be 0.25 m/s or less, preferably 0.15 m/s or less.

The communication unit 830 may perform communication with the external device. At this time, the external device may include at least one of the cloud server C, the data learning server DS and the user terminal U. The communication of the communication unit 830 with an external device may include communicating with the external device via the third device or the like. For example, the communication unit 830 may receive a remote control signal for controlling the air conditioner A from the user terminal U.

The communication unit 830 may communicate with an external device via wired communication or wireless communication. For example, the communication unit 830 may communicate with a control terminal device via a cellular communication, near field communication, and an Internet network as well as a port to be connected via a cable, and perform communication according to standards such as universal serial bus (USB) communication, a Wi-Fi, Bluetooth, Zigbee, infrared data association (IrDA), RF such as UHF and VHF, and ultra-wide band (UWB) communication.

The storage 840 stores various software and programs for performing the function of the air conditioner A. Specifically, the storage 840 may store a temperature control algorithm according to a plurality of operation modes. The temperature control algorithm may include the change in the set temperature, the intensity of the wind speed, the direction of the wind speed or the like depending on a predetermined period for each operation mode. Further, according to the disclosure, the storage 840 may store the learned learning model based on the set temperature and the current temperature.

The processor 850 may read the program or the like stored in the storage 840. Specifically, in order to perform the function of the air conditioner A, the processor 850 may read programs including a series of readable instructions and perform the air conditioning according to the set temperature.

The processor 850 may sense the pressure and/or the temperature of the refrigerant in the indoor heat exchanger (not shown) to sense whether the air conditioning is normally performed. For example, the processor 850 may sense whether the pipe of the indoor heat exchanger is damaged or is covered with frost and whether water generated by condensation of vapor in the air is appropriately removed.

The processor 850 may control a speed of the blowing fan 820. Specifically, the processor 850 may control the current temperature measured by the temperature sensor 810 and the speed at which the blowing fan 820 rotates depending on the set temperature. Specifically, the processor 850 may control the speed at which the blowing fan 820 rotates depending on the difference between the current temperature and the set temperature. For example, if the difference between the current temperature and the set temperature is large, the rotation speed of the blowing fan 820 is controlled to be quick to reach the set temperature quickly, and if the difference between the room temperature and the set temperature is small or the room temperature reaches the set temperature, the room temperature excessively too drops, the rotation speed of the blowing fan 820 may be slow so that a compressor of an outdoor unit is not turned off. For example, the processor 850 may control the rotating speed of the blowing fan 820 between 500 RPM and 900 RPM.

The processor 850 may control the communication unit 830 to transmit the current temperature and the set temperature sensed by the temperature sensor 810 to an external device.

In addition, the processor 850 may control the communication unit 830 to receive the recommended temperature received from the external device and control the recommended temperature acquired through the communication unit 830 to be set in the air conditioner A as the set temperature.

In addition, the processor 850 may control the communication unit 830 to transmit the current temperature sensed by the temperature sensor 810 to the external device, and may receive the recommended temperature depending on the transmission of the current temperature from the external device and set the received recommended temperature in an air conditioner. In this case, the recommended temperature may be a result of applying the current temperature sensed by the temperature sensor 810 to the learned learning model using a plurality of set temperatures and a plurality of current temperatures set in the air conditioner A. In this case, the external device may include at least one of the cloud server C, the learning model server DS, and the third device communicatively connected to the cloud server C or the learning model server DS.

According to various embodiments, there may be the network system that includes the air conditioner A and the learning model server DS generating the learning model using the learning data acquired from the air conditioner A.

In this case, the air conditioner A of the network system may include the temperature sensor 810 sensing the current temperature, the blowing fan 820 discharging cooling air to the outside, and the communication unit 830 capable of communicating with an external device. The air conditioner A may include the processor 850 which controls the communication unit 830 to transmit the set temperature set in the air conditioner A and the current temperature sensed by the temperature sensor 810 to an external device.

In this case, the external device may include at least one of the cloud server C, the learning model server DS, and the third device communicatively connected to the cloud server C or the learning model server DS.

In addition, the learning model server DS of the network system may include the learning data acquisition unit (e.g., learning data acquisition unit 203a of FIG. 2A) which acquires the current temperature and the set temperature transmitted from the air conditioner A, the model learning unit (e.g., model learning unit 203b of FIG. 2A) which generates the learning model using the set temperature and the current temperature, and the storage (e.g., storage 202 of FIG. 2A) which stores the learned learning model to provide the recommended temperature of the air conditioner A as the result of generating the learning model.

According to various embodiments, there may be the network system that includes the air conditioner A and the learning model server DS providing the recommended temperature using the recognition data acquired from the air conditioner A.

In this case, the air conditioner A of the network system includes the temperature sensor 810 sensing the current temperature, the blowing fan 820 discharging the cooling air to the outside, the communication unit 830 capable of communicating with the external device, and the processor 850 controlling the communication unit 830 to transmit the current temperature sensed by the temperature sensor 810 to the external device.

In this case, the external device may include at least one of the cloud server C, the learning model server DS, and the third device communicatively connected to the cloud server C or the learning model server DS.

In addition, the learning model server DS may include the storage (e.g., storage 202 of FIG. 2B) storing the learned learning models to provide the recommended temperature of the air conditioner A, the recognition data acquisition unit (e.g., recognition data acquisition unit 203c of FIG. 2B) acquiring the current temperature of the air conditioner A, and the model applier (e.g., the model applier 203d of FIG. 2B) acquiring the recommended temperature of the air conditioner A by inputting the current temperature as the learning model, and a communication unit (e.g., communication unit 201 of FIG. 2B) transmitting the acquired recommended temperature to the external device. The external device may include the air conditioner A or the third device communicatively connected to the air conditioner A. In addition, the external device may include the user terminal U or the third device communicatively connected to the user terminal U to transmit the recommended temperature.

Figure 9:
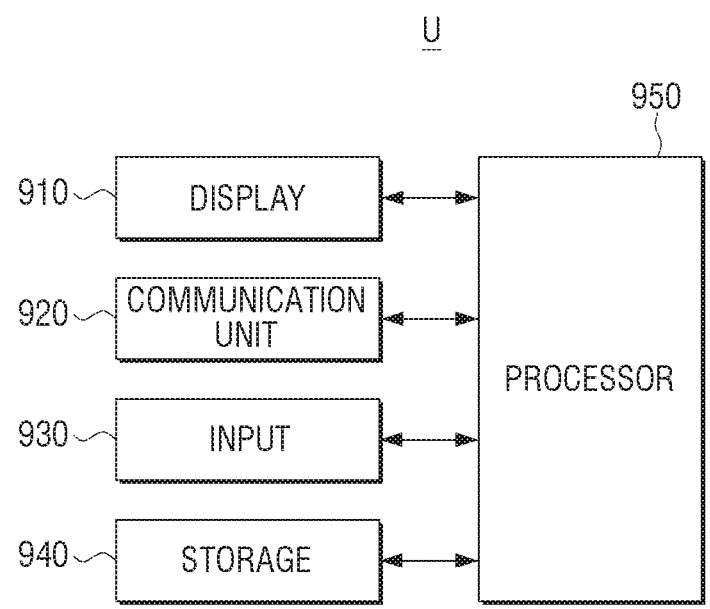
FIG. 9 is a block diagram showing a configuration of a user terminal U according to an embodiment of the disclosure.

FIG. 9 is a block diagram showing a configuration of a user terminal according to an embodiment of the disclosure.

Referring to FIG. 9, the user terminal U may include a display 910, a communication unit 920, an input 930, a storage 940, and a processor 950.

The display 910 may visually provide information to the user of the user terminal U. For example, the display 910 may display a screen including the artificial intelligence operation UI under the control of the processor 950.

The communication unit 920 may establish a wired or wireless communication unit channel between the user terminal U and the external device, and support the communication performance through the established communication channel. The external device may include at least one of, for example, the cloud server C, the learning model server DS, and the third device communicatively connected to the cloud server C or the learning model server DS.

The communication unit 920 may communicate with the external device through the near field communication networks (e.g., Bluetooth, WiFi direction, or infrared data association (IrDA) or the like) or the remote communication networks (e.g., cellular network, Internet, or computer network (e.g., LAN or WAN) or the like) using the wireless communication modules (e.g., cellular communication module, local area wireless communication module, and global navigation satellite system (GNSS) communication module) or the wired communication module (e.g., local area network (LAN) communication module or power line communication module). Several kinds of communication modules described above may be implemented as a single chip or may each be implemented as a separate chip.

The input 930 may receive commands or data to be used for the components (e.g., processor 950) of the user terminal U from the outside (e.g., user) of the user terminal U. The input 930 may include, for example, a button, a microphone, a touch panel, or the like. The input 930 may transmit the user input signal generated depending on the user input for controlling the user terminal U to the processor 950.

The storage 940 may store various data used by at least one component (e.g., processor 950) of the user terminal U, for example, software (e.g., a program) and may store the input data or the output data for the command associated therewith. The storage 940 may include the volatile and/or non-volatile memory.

The program is software stored in the storage 940, and may include, for example, an operating system, middleware, or an application.

The processor 950 may drive, for example, software (e.g., program) stored in the storage 940 to control at least one other components (e.g., hardware or software components) of the user terminal U connected to the processor 950, and perform various data processing and operations. The processor 950 may load a command or data received from other components (e.g., communication unit 920) in the volatile memory and process the loaded command or data and may store the result data in the non-volatile memory. According to an embodiment, the processor 950 may include main processors (e.g., a central processing unit or an application processor), and sub-processors (e.g., a graphic processor, an image signal processor, a sensor hub processor, or a communication processor) which are operated independently of the main processor and additionally or alternatively use lower power than the main processor or are specialized to the designated functions. The sub-processor may be operated separately from the main processor or may be operated while being embedded.

According to various embodiments, if the user input signal depending on the user input selecting the artificial intelligence operation UI included in the screen provided by the display 910 is received via the input 930, the processor 950 may control the communication unit 920 to transmit the artificial intelligence operation request signal corresponding to the artificial intelligence operation UI to the air conditioner A. If the recommended temperature set in the air conditioner A depending on the artificial intelligence operation request signal is acquired through the communication unit 920, the processor 950 may control the display 910 to display the acquired recommended temperature. At this time, the recommended temperature may be acquired as a result obtained by allowing the air conditioner A to apply the current temperature of the air conditioner A to the learning model. In this case, the processor 950 may control the display 910 so that the user displays the set temperature, which is set in the air conditioner A in the past, at the current temperature, together with the recommended temperature.

According to various embodiments, there may be a network system including the air conditioner A and the user terminal U controlling the air conditioner A.

In this case, if the user input signal depending on the user input selecting the artificial intelligence operation UI included in the screen provided by the display 910 of the user terminal U is received via the input 930, the processor 950 may control the communication unit 920 to transmit the artificial intelligence operation request signal corresponding to the artificial intelligence operation UI to the air conditioner A.

If the air conditioner A receives the artificial intelligent operation request through the communication unit 830 of the air conditioner A, the processor 850 of the air conditioner A may control the communication unit 830 to transmit the current temperature of the air conditioner A to the external device. The processor 850 of the air conditioner A may control the communication unit 830 to receive the recommended temperature depending on the transmission of the current temperature from the external device. The processor 850 may set the recommended temperature received through the communication unit 830 in the air conditioner A. In this case, the recommended temperature may be the result obtained by applying the current temperature to the learned learning model based on the plurality of set temperatures previously set in the air conditioner A and the plurality of current temperatures. In this case, the external device may include at least one of the cloud server C, the learning model server DS, and the third device communicatively connected to the cloud server C or the learning model server DS.

Figure 10A:
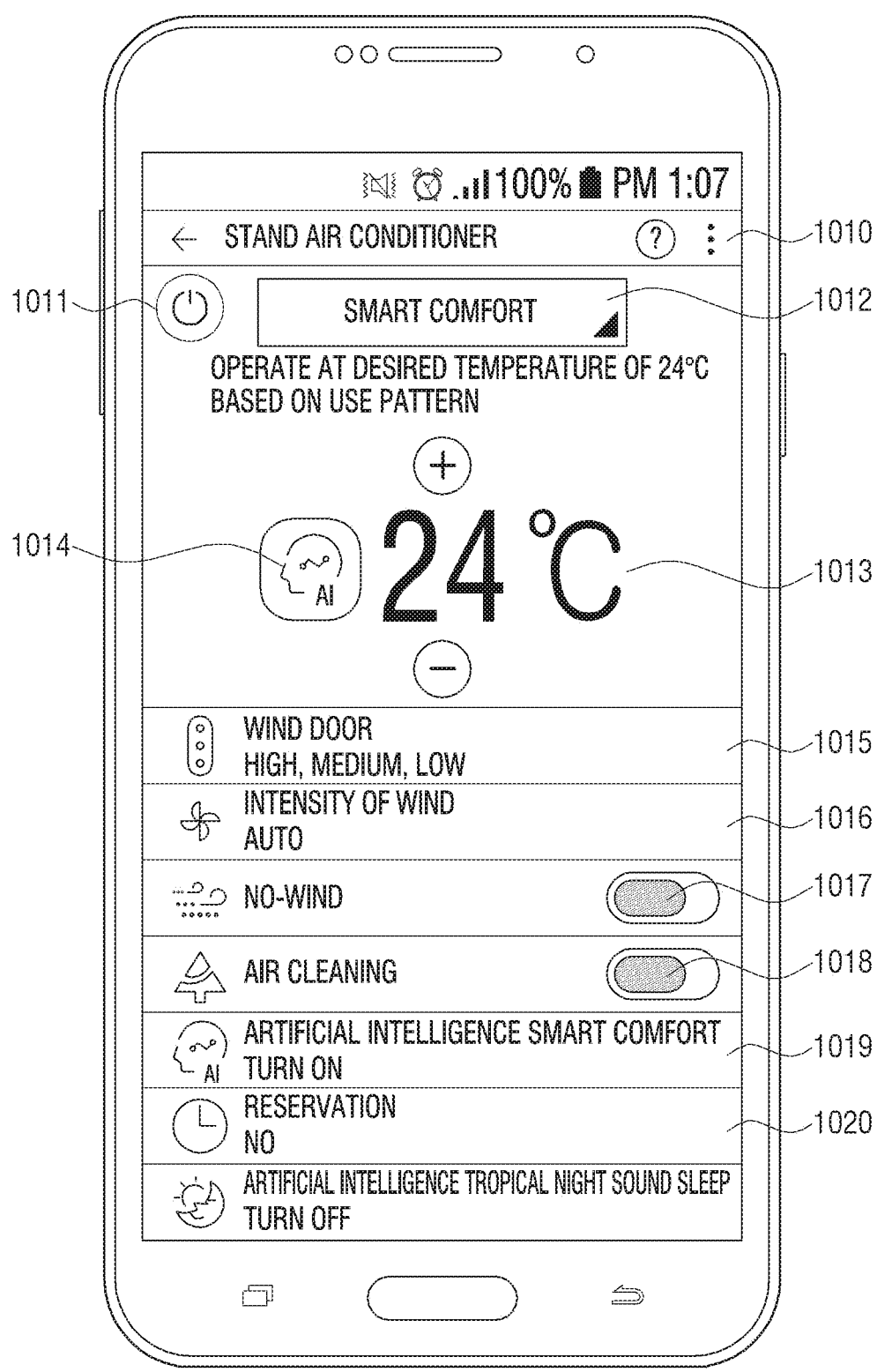
FIGS. 10A and 10B are diagrams showing a screen of a user terminal on which a recommended temperature is displayed, according to an embodiment of the disclosure.
Figure 10B:
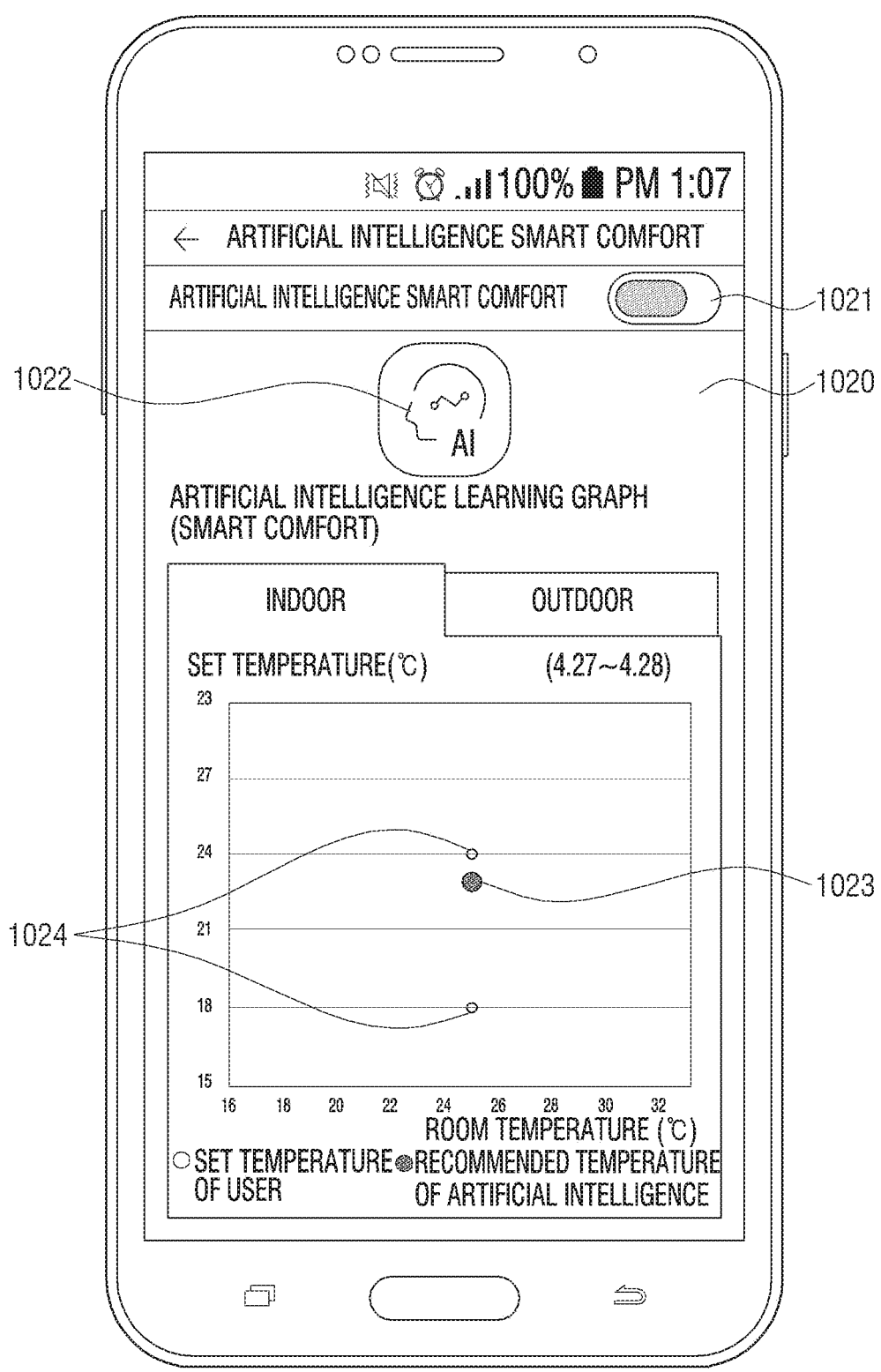

FIGS. 10A and 10B are diagrams showing a screen of a user terminal on which a recommendation temperature is displayed, according to an embodiment of the disclosure.

Referring to FIG. 10A, the user terminal U may display an air conditioner control screen 1010 by executing an application capable of controlling the air conditioner A.

The air conditioner control screen 1010 may include a UI 1011 turning on/off the air conditioner A, a UI 1012 selecting an operation mode of the air conditioner A, current temperature information 1013, information on whether artificial intelligence mode operates 1014, a wind door setting UI 1015, a wind intensity setting UI 1016, a no wind operation UI 1017, an UI about whether air cleaning operation 1018, an artificial intelligence setting UI 1019, a reservation setting UI 1020, and the like.

In this case, when the air conditioner control screen 1010 is out of the viewport range of the display of the user terminal UI, the user may display the air conditioner control screen 1110, which is out of the viewport range, in the viewport range through a drag gesture.

Referring to FIGS. 10A and 10B, in this situation, if the user input for selecting the artificial intelligence setting UI 1019 is received, the user terminal U may display the artificial intelligence control screen 1020 in the operation mode (e.g., smart comfort mode) of the air conditioner A as shown in FIG. 10B. The artificial intelligence control screen 1020 may include the artificial intelligence operation UI 1021 for the artificial intelligence mode operation of the air conditioner A and the artificial intelligence operation information 1022 indicating the artificial intelligence mode operation of the air conditioner A.

In this case, if the user input for selecting the artificial intelligence operation UI 1021 is received, the user terminal U may acquire the recommended temperature set in the air conditioner based on the user input. For example, the user terminal U may acquire the recommended temperature via the third device (e.g., access point (AP)) communicatively connected to the cloud server C.

Then, the user terminal U may display the recommended temperature 1023 on the artificial intelligence control screen 1020. At this time, the recommended temperature 1023 may be acquired as the result obtained by allowing the air conditioner A to apply the current temperature of the air conditioner A to the learning model server DS, based on the user input selecting the artificial intelligence operation UI 1021.

The user terminal U may display not only the recommended temperature 1023 on the artificial intelligence control screen 1020, but also the set temperature 1024 that the user of the air conditioner A directly sets in the air conditioner A in the past. In this case, the recommended temperature 1023 and the set temperature 1034 may be displayed on the graph together to be comparable with each other.

Figure 11:
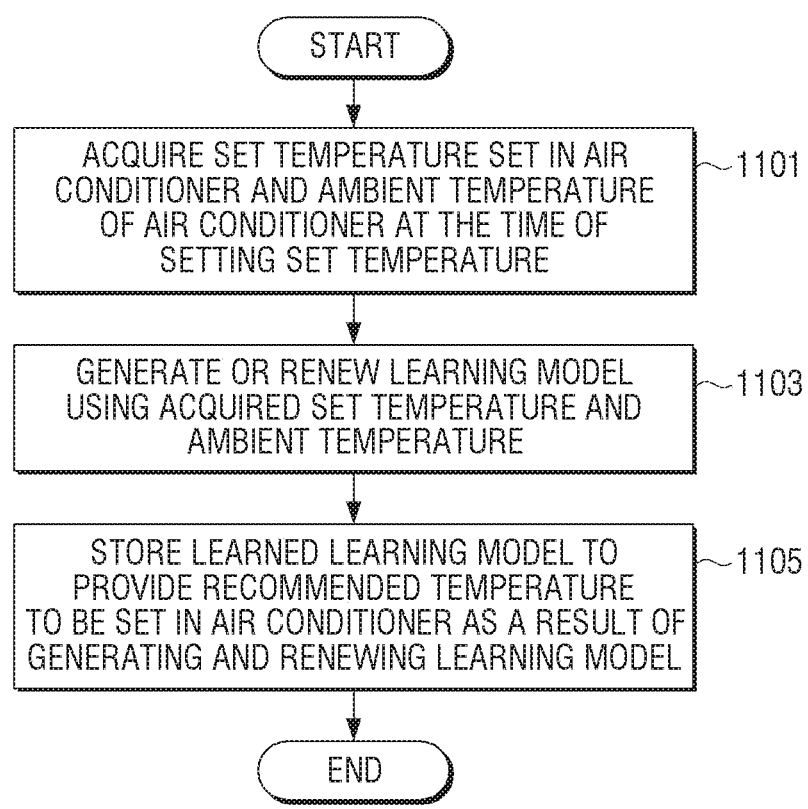
FIG. 11 is a flow chart showing a method for generating a learning model of a data learning server according to an embodiment of the disclosure.

FIG. 11 is a flow chart showing a method for generating a learning model of a data learning server according to an embodiment of the disclosure.

Referring to FIG. 11, in operation 1101, the data learning server DS may acquire the set temperature set in the air conditioner A and the current temperature of the air conditioner A at the time of setting the temperature. Further, the data learning server DS may further acquire the external environment information of the air conditioner A.

At this time, the data learning server DS may acquire the set temperature and the current temperature from the bridge server BS communicatively connected to the air conditioner A, and acquire the external environment information from the smart home service server SS communicatively connected to the external contents providing server (CP).

Further, the data learning server DS may further acquire the time information at the time of setting the temperature in the air conditioner A.

In operation 1103, the data learning server DS may generate or renew the learning model using the acquired set temperature and current temperature.

When the data learning server DS further acquires the external environment information, the data learning server DS may generate or renew the learning model using the acquired set temperature, the current temperature, and the external environment information.

In addition, when the data learning server DS further acquires the time information at the time of setting the temperature, the data learning server DS may generate or renew the learning model using the acquired set temperature, the current temperature, and the time information.

In operation 1105, the data learning server DS may store the learned learning model to provide the recommended temperature to be set in the air conditioner A as the result of generating and renewing the learning model.

Meanwhile, the data learning server DS may generate or renew the plurality of learning models for each operation mode of the air conditioner A. In this case, the data learning server DS may store the plurality of learning models.

Figure 12:
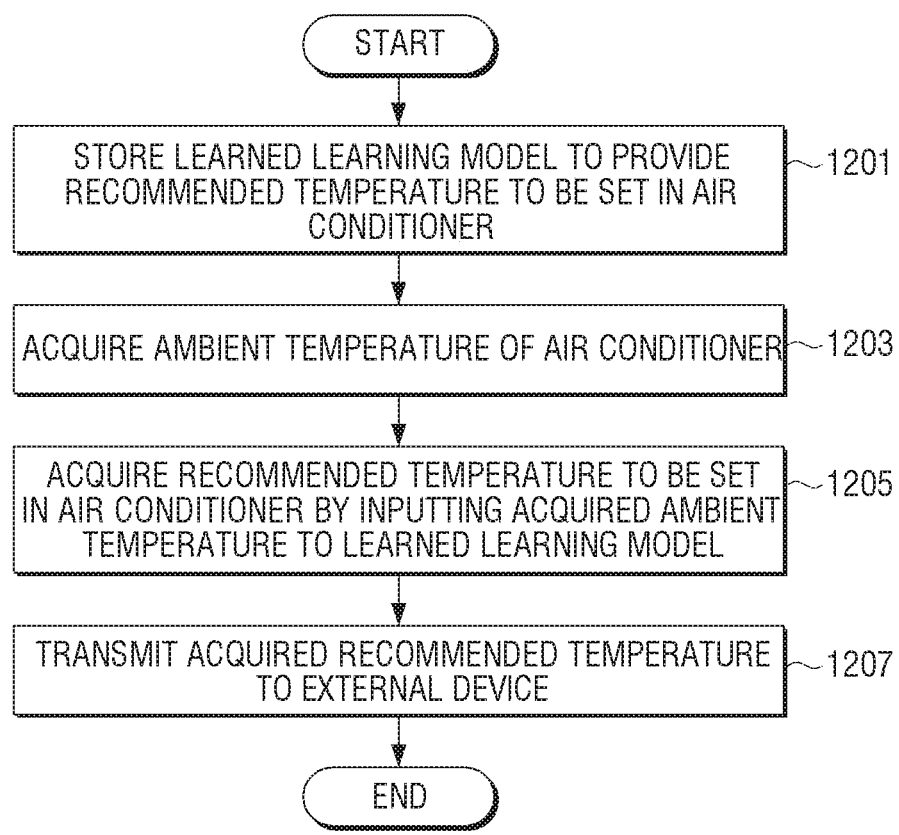
FIG. 12 is a flow chart showing a method for using a learning model of a data learning server according to an embodiment of the disclosure.

FIG. 12 is a flow chart showing a method for using a learning model of a data learning server according to an embodiment of the disclosure.

Referring to FIG. 12, in operation 1201, the data learning server DS may store the learned learning model to provide the recommended temperature to be set in the air conditioner A.

In a situation where the learned learning model is stored, in operation 1203, the data learning server DS may acquire the current temperature of the air conditioner A. In this case, the data learning server DS may further acquire the external environment information of the air conditioner A.

In operation 1205, the data learning server DS may input the acquired current temperature to the learned learning model to acquire the recommended temperature to be set in the air conditioner A.

In addition, when the data learning server DS further acquires the external environment information, the data learning server DS may input the acquired recommended temperature and external environment information to the learning model to acquire the recommended temperature to be set in the air conditioner A.

Meanwhile, the data learning server DS may store the plurality of learning models for each operation mode of the air conditioner A. In this case, the data learning server DS may input the acquired current temperature to the learning model corresponding to the current operation mode of the air conditioner A and input the acquired current temperature to the learning model corresponding to the current operation mode of the air conditioner A to acquire the recommended temperature to be set in the air conditioner A.

In operation 1207, the data learning server DS may transmit the acquired recommended temperature to the external device. The external device may be, for example, the air conditioner A or the third device communicatively connected to the air conditioner A to transmit the recommended temperature. In addition, the external device may be the user terminal U or the third device communicatively connected to the user terminal U to transmit the recommended temperature.

Figure 13:
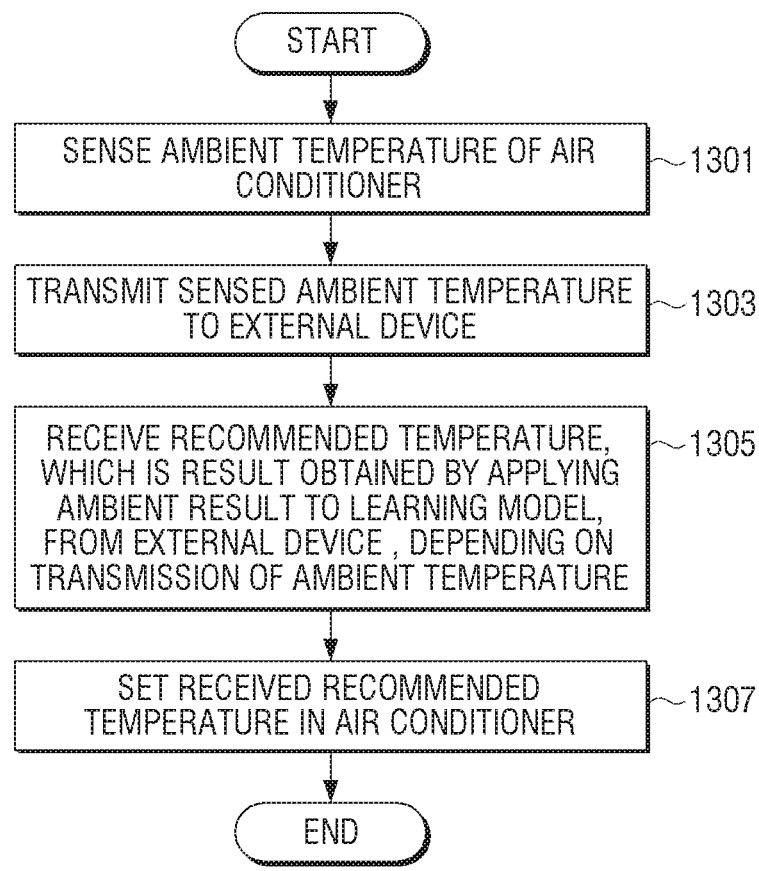
FIG. 13 is a flow chart showing a method for providing a recommended temperature of an air conditioner according to an embodiment of the disclosure.

FIG. 13 is a flow chart showing a method for providing a recommended temperature of an air conditioner A according to an embodiment of the disclosure.

Referring to FIG. 13, in operation 1301, the air conditioner A may sense the current temperature of the air conditioner A.

Next, in operation 1303, the air conditioner A may transmit the sensed current temperature to the external device. For example, the air conditioner A may transmit the sensed current temperature to at least one of the cloud server C, the learning model server DS, and the third device communicatively communicating with the cloud server C or the learning model server DS.

In operation 1305, the air conditioner A may receive the recommended temperature, which is the result of applying the current temperature to the learning model, from the external device depending on the transmission of the current temperature. In this case, the recommended temperature may be the result obtained by applying the current temperature to the learned learning model based on the plurality of set temperatures previously set in the air conditioner A and the plurality of current temperatures.

In operation 1307, the air conditioner A may set the received recommended temperature in the air conditioner.

Figure 14:
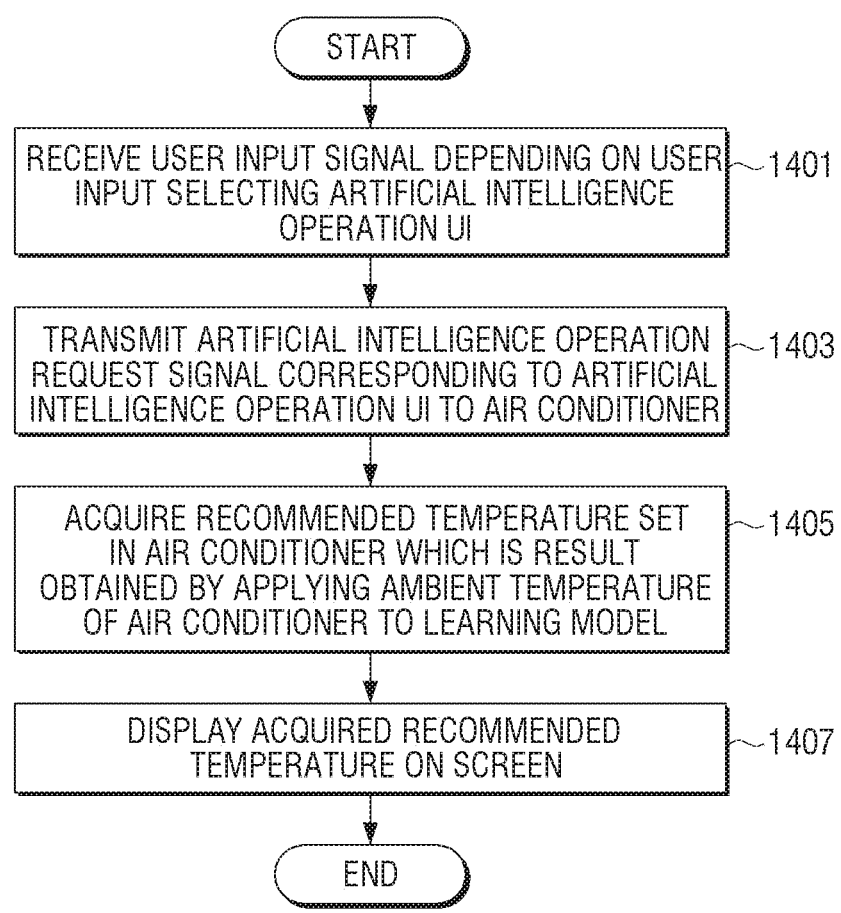
FIG. 14 is a flow chart showing a method for controlling an air conditioner of a user terminal according to an embodiment of the disclosure.

FIG. 14 is a flow chart showing a method for controlling an air conditioner of a user terminal according to an embodiment of the disclosure.

Referring to FIG. 14, in operation 1401, the user terminal U may receive the user input signal depending on the user input selecting the artificial intelligence operation UI.

In operation 1403, the user terminal U may transmit the artificial intelligence operation request signal corresponding to the artificial intelligence operation UI to the air conditioner A in response to the user input signal.

In operation 1405, the user terminal U may acquire the recommended temperature set in the air conditioner A as the result of applying the current temperature of the air conditioner A to the learning model depending on the artificial intelligence operation request signal.

In operation 1407, the user terminal U may display the acquired recommended temperature on the screen. In this case, the user terminal U may display the set temperature that the user previously sets in the air conditioner A together with the recommended temperature, at the current temperature.

FIG. 15 is a flow chart of a network system including a user terminal and an air conditioner according to an embodiment of the disclosure.

Referring to FIG. 15, in operation 1501, the user terminal U may receive the user input signal depending on the user input selecting the artificial intelligence operation UI.

In operation 1503, the user terminal U may transmit the artificial intelligence operation request signal corresponding to the artificial intelligence operation UI to the air conditioner A.

In operation 1505, the air conditioner A may sense the current temperature of the air conditioner A.

Next, in operation 1507, the air conditioner A may transmit the sensed current temperature to an external device 1500. The external device may include at least one of the cloud server C, the learning model server DS, and the third device communicatively connected to the cloud server C, or the learning model server DS.

In operation 1509, the air conditioner A may receive the recommended temperature, which is the result of applying the current temperature to the learning model, from the external device 1500 depending on the transmission of the current temperature. In this case, the learning model may be the learning model learned using the plurality of set temperatures previously set in the air conditioner A and the plurality of current temperatures.

In operation 1511, the air conditioner A may set the received recommended temperature in the air conditioner.

The disclosed embodiments may be implemented as a S/W program that includes instructions stored on a computer-readable storage medium.

The computer is an apparatus which calls stored instructions from the storage medium and can be operated according to the disclosed embodiment depending on the called instructions, and may include the data learning server according to the disclosed embodiments or the external server communicatively connected to the data learning server. Alternatively, the computer may include the air conditioner or the external server communicatively connected to the air conditioner, according to the disclosed embodiments.

The computer-readable storage medium may be provided in the form of a non-transitory storage medium. The 'non-transitory' means that the storage medium does not include a signal and a current, and is tangible, but the 'non-transitory' does not distinguish whether data are semi-permanently or temporarily stored in the storage medium. By way of example, the non-transitory storage medium may be temporarily stored media such as register, cache, and buffer as well as non-transitory readable recording media such as CD, DVD, hard disk, Blu-ray disk, USB, internal memory, memory card, ROM, and RAM.

Furthermore, the method according to the disclosed embodiments may be provided as a computer program product.

The computer program product may include a S/W program, a computer-readable storage medium in which the S/W program is stored, or a product traded between a seller and a purchaser.

For example, a computer program product may include a product (e.g., downloadable app) in the form of the software program electronically distributed via the data learning server, the manufacturer of the air conditioner or the electronic market (e.g., Google Play store, AppStore). For the electronic distribution, at least a part of the software programs may be stored on a storage medium or may be generated temporarily. In this case, the storage medium may be a manufacturer or a server of an electronic market, or a storage medium of a relay server.

Although embodiments of the disclosure have been illustrated and described, the disclosure is not limited to the above-mentioned specific embodiment, but may be variously modified by those skilled in the art to which the disclosure pertains without departing from the spirit and scope of the disclosure as claimed in the claims. In addition, such modifications should also be understood to fall within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A data learning server, comprising:
a communicator;
a storage; and
at least one processor configured to:
    obtain a set temperature set in an air conditioner and a current ambient room temperature of the air conditioner at a time of setting the set temperature, via the communicator,
    apply the set temperature and the current ambient room temperature to a learning model, and
    obtain a recommended temperature set in the air conditioner,
wherein the learning model learns to provide the recommended temperature based on the set temperature and the current ambient room temperature.

2. The data learning server as claimed in claim 1, wherein the at least one processor is further configured to:
acquire external environment information, and
generate or renew the learning model using the set temperature, the current ambient room temperature, and the external environment information.

3. The data learning server as claimed in claim 2, wherein the external environment information comprises at least one of an outside temperature and an outside humidity at the time of setting the set temperature.

4. The data learning server as claimed in claim 2, wherein the at least one processor is further configured to:
acquire the set temperature and the current ambient room temperature from a bridge server communicatively connected to the air conditioner via the communicator, and
acquire the external environment information from a smart home service server which is communicatively connected to an external contents providing server via the communicator.

5. The data learning server as claimed in claim 1, wherein at least one processor is further configured to:
acquire time information at the time of setting the set temperature, and
generate or renew the learning model using the set temperature, the current ambient room temperature, and the time information.

6. The data learning server as claimed in claim 1, wherein the at least one processor is further configured to generate or renew a plurality of learning models for each operation mode of the air conditioner, and
wherein the storage is further configured to store the plurality of learning models.

7. A data learning server, comprising:
a storage configured to store a learned learning model to provide a recommended temperature to be set to an air conditioner;
at least one processor configured to:
    obtain a current ambient room temperature of the air conditioner,
    apply the set temperature and the current ambient room temperature to a learned learning model, and
    obtain the recommended temperature set in the air conditioner; and
a communicator configured to transmit the recommended temperature to an external device,
wherein the learned learning model learns to provide the recommended temperature based on the set temperature and the current ambient room temperature.

8. The data learning server as claimed in claim 7, wherein the at least one processor is further configured to:
acquire external environment information, and
input the current ambient room temperature and the external environment information to the learned learning model to acquire the recommended temperature to be set in the air conditioner.

9. The data learning server as claimed in claim 7, wherein, when the storage stores a plurality of learning models for each operation mode of the air conditioner, the at least one processor is further configured to input the current ambient room temperature to the learned learning model corresponding to a current operation mode of the air conditioner to acquire the recommended temperature of the air conditioner.

10. An air conditioner, comprising:
a blowing fan configured to discharge cooling air to an outside;
a temperature sensor configured to sense a current ambient room temperature around the air conditioner;
a communicator configured to communicate with an external device; and
at least one processor configured to:
    control the communicator to transmit a set temperature set in the air conditioner and the current ambient room temperature of the air conditioner at a time of setting the set temperature, via the communicator,
    control the communicator to receive a recommended temperature, which is a result obtained by applying the set temperature to a learning model, and
    set the received recommended temperature in the air conditioner,
wherein the learning model learns to provide the recommended temperature based on the set temperature and the current ambient room temperature.

11. A user terminal controlling an air conditioner, the user terminal comprising:
a display configured to display a screen;
a communicator configured to communicate with an external device;
an input receiver configured to receive a user input; and at least one processor configured to:
control the communicator to transmit an artificial intelligence operation request signal corresponding to an artificial intelligence operation user interface (UI) to the air conditioner in response to a user input signal depending on a user input selecting an artificial intelligence operation UI included in the screen being received via the input receiver, and
control the display to display a recommended temperature in response to the recommended temperature set in the air conditioner, which is a result obtained by:
obtaining a set temperature set in the air conditioner and a current ambient room temperature of the air conditioner at a time of setting the set temperature, via the communicator,
applying the set temperature and the current ambient room temperature to a learning model, and
obtaining the recommended temperature set in the air conditioner,
wherein the learning model learns to provide the recommended temperature based on the set temperature and the current ambient room temperature.

12. The user terminal as claimed in claim 11, wherein the at least one processor is further configured to control the display to display a set temperature previously set in the air conditioner at the current ambient room temperature, together with the recommended temperature.

13. A network system, comprising:
an air conditioner; and
a learning model server configured to generate a learning model using learning data acquired from the air conditioner,
wherein the air conditioner comprises:
a blowing fan configured to discharge cooling air to an outside,
a temperature sensor configured to sense a current ambient room temperature around the air conditioner,
a communicator configured to communicate with an external device, and
at least one air conditioner processor configured to control the communicator to transmit a set temperature set in the air conditioner and the current ambient room temperature sensed by the temperature sensor to the external device,
wherein the learning model server comprises:
at least one server processor configured to:
obtain the set temperature set in an air conditioner and the current ambient room temperature of the air conditioner at a time of setting the set temperature,
apply the set temperature and the current ambient room temperature to a learning model, and
obtain a recommended temperature set in the air conditioner, and
wherein the learning model learns to provide the recommended temperature based on the set temperature and the current ambient room temperature.

14. A network system, comprising:
an air conditioner; and
a learning model server configured to provide a recommended temperature using a recognition data acquired from the air conditioner,
wherein the air conditioner comprises:
a blowing fan configured to discharge cooling air to an outside,
a temperature sensor configured to sense a current ambient room temperature of the air conditioner,
an air conditioner communicator configured to communicate with an external device, and
at least one air conditioner processor configured to control the air conditioner communicator to transmit the current ambient room temperature sensed by the temperature sensor to the external device,
wherein the learning model server comprises:
a storage configured to store a learned learning model to provide a recommended temperature of the air conditioner,
at least one server processor configured to:
obtain a set temperature set in an air conditioner and the current ambient room temperature,
apply the set temperature and the current ambient room temperature to the learned learning model,
obtain the recommended temperature set in the air conditioner, and
a server communicator configured to transmit the recommended temperature to the external device, and
wherein the learned learning model learns to provide the recommended temperature based on the set temperature and the current ambient room temperature.

15. A network system, comprising:
an air conditioner; and
a user terminal configured to control the air conditioner,
wherein the user terminal comprises:
a display configured to display a screen,
a terminal communicator configured to communicate with an external device,
an input receiver configured to receive a user input, and
at least one terminal processor configured to control the terminal communicator to transmit an artificial intelligence operation request signal corresponding to an artificial intelligence operation user interface (UI) to the air conditioner in response to a user input signal depending on a user input selecting the artificial intelligence operation UI included in the screen being received via the input receiver,
wherein the air conditioner comprises:
a blowing fan configured to discharge cooling air to an outside,
a temperature sensor configured to sense a current ambient room temperature around the air conditioner,
an air conditioner communicator configured to communicate with the external device, and
at least one air conditioner processor configured to:
control the air conditioner communicator to:
transmit the current ambient room temperature to the external device,
receive a recommended temperature depending on a transmission of the current ambient room temperature from the external device in response to the artificial intelligence operation request being received through the air conditioner communicator, and
set the received recommended temperature in the air conditioner,
wherein the recommended temperature is a result obtained by:
obtaining a set temperature set in the air conditioner and the current ambient room temperature of the air conditioner at a time of setting the set temperature,
applying the set temperature and the current ambient room temperature to a learned learning model based on a plurality of set temperatures previously set in the air conditioner and a plurality of current ambient room temperatures, and obtain the recommended temperature set in the air conditioner, and wherein the learned learning model learns to provide the recommended temperature based on the set temperature and the current ambient room temperature.

16. A method for generating a learning model of a data learning server, the method comprising:

obtaining a set temperature set in an air conditioner and a current ambient room temperature of the air conditioner at a time of setting the set temperature;

applying the set temperature and the current ambient room temperature to the learning model;

obtaining a recommended temperature set in the air conditioner; and storing the learning model to provide the recommended temperature set in the air conditioner as a result of the applying the set temperature and the current ambient room temperature to the learning model, wherein the learning model learns to provide the recommended temperature based on the set temperature and the current ambient room temperature.

17. The method as claimed in claim 16, further comprising:

acquiring external environment information of the air conditioner, wherein the generating or renewing of the learning model comprises generating or renewing the learning model using the set temperature, the current ambient room temperature, and the external environment information.

18. The method as claimed in claim 17, wherein the external environment information comprises at least one of an outside temperature or an outside humidity at the time of setting the set temperature.

19. The method as claimed in claim 17, wherein the acquiring of the set temperature and the current ambient room temperature comprises acquiring the set temperature and the current ambient room temperature from a bridge server communicatively connected to the air conditioner, and wherein the acquiring of the external environment information comprises acquiring the external environment information from a smart home service server which is communicatively connected to an external contents providing server.

20. The method as claimed in claim 16, further comprising:

acquiring time information at the time of setting the set temperature, wherein the generating or renewing the learning model comprises generating or renewing the learning model using the set temperature, the current ambient room temperature, and the time information.

21. The method as claimed in claim 16, wherein the generating or renewing the learning model comprises generating or renewing a plurality of learning models for each operation mode of the air conditioner, and wherein the storing of the learning model comprises storing the plurality of learning models.

22. A method for using a learning model of a data learning server, the method comprising:

storing a learned learning model to provide a recommended temperature to be set to an air conditioner;

obtaining a set temperature set in an air conditioner and a current ambient room temperature of the air conditioner;

applying the set temperature and the current ambient room temperature to the learned learning model;

obtaining the recommended temperature to be set in the air conditioner; and transmitting the recommended temperature to an external device, wherein the learned learning model learns to provide the recommended temperature based on the set temperature and the current ambient room temperature.

23. The method as claimed in claim 22, further comprising:

acquiring external environment information of the air conditioner, wherein the acquiring of the recommended temperature to be set in the air conditioner comprises inputting the current ambient room temperature and the external environment information to the learned learning model to acquire the recommended temperature to be set in the air conditioner.

24. The method as claimed in claim 22, wherein the storing of the learned learning model comprises storing a plurality of learning models for each operation mode of the air conditioner, and wherein the obtaining of the recommended temperature to be set in the air conditioner comprises inputting the current ambient room temperature to the learned learning model corresponding to a current operation mode of the air conditioner to acquire the recommended temperature to be set in the air conditioner.

25. A method for providing a recommended temperature of an air conditioner, the method comprising:

sensing a current ambient room temperature of the air conditioner;

transmitting the sensed current ambient room temperature to an external device;

receiving a recommended temperature, which is a result obtained by:

obtaining a set temperature set in an air conditioner and the current ambient room temperature of the air conditioner at a time of setting the set temperature, applying the set temperature and the current ambient room temperature to a learning model, from the external device depending on a transmission of the current ambient room temperature, and obtaining a recommended temperature set in the air conditioner; and setting the received recommended temperature in the air conditioner, wherein the learning model is a learning model learned using a plurality of set temperatures previously set in the air conditioner and a plurality of current ambient room temperatures, and wherein the learning model learns to provide the recommended temperature based on the set temperature and the current ambient room temperature.

26. A method for controlling an air conditioner of a user terminal, the method comprising:

receiving a user input signal depending on a user input selecting an artificial intelligence operation user interface (UI);

transmitting an artificial intelligence operation request signal corresponding to the artificial intelligence operation UI to the air conditioner;

acquiring a recommended temperature set in the air conditioner which is a result obtained by:
    obtaining a set temperature set in an air conditioner and a current ambient room temperature of the air conditioner at a time of setting the set temperature,
    applying the set temperature and the current ambient room temperature of the air conditioner to a learning model depending on the artificial intelligence operation request signal, and
    obtaining the recommended temperature set in the air conditioner; and
displaying the acquired recommended temperature on a screen,
wherein the learning model learns to provide the recommended temperature based on the set temperature and the current ambient room temperature.

27. The method as claimed in claim 26, further comprising:
displaying a set temperature previously set in the air conditioner at the current ambient room temperature, together with the recommended temperature.

28. A method for generating a learning model of a network system including an air conditioner and a learning model server, the method comprising:
receiving, by the air conditioner, a user control signal setting a temperature;
transmitting, by the air conditioner, the set temperature and a current ambient room temperature of the air conditioner to an external device;
generating, by the learning model server, the learning model using the set temperature and the current ambient room temperature; and
storing, by the learning model server, the generated learning model to provide a recommended temperature of the air conditioner,
wherein the generating, by the learning model server, of the learning model using the set temperature and the current ambient room temperature comprises:
    obtaining the set temperature set in an air conditioner and the current ambient room temperature of the air conditioner at a time of setting the set temperature,
    applying the set temperature and the current ambient room temperature to the learning model, and
    obtaining a recommended temperature set in the air conditioner.

29. A method for providing a recommended temperature in a network system including an air conditioner and a learning model server, the method comprising:
transmitting, by the air conditioner, a current ambient room temperature of the air conditioner to an external device;
acquiring, by the learning model server, the recommended temperature of the air conditioner by applying a set temperature and the current ambient room temperature to a learning model; and
transmitting, by the air conditioner, the recommended temperature to the external device,
wherein the acquiring, by the learning model server, of the recommended temperature of the air conditioner by applying the set temperature and the current ambient room temperature to the learning model comprises:
    obtaining the set temperature set in an air conditioner and the current ambient room temperature of the air conditioner at a time of setting the set temperature,
    applying the set temperature and the current ambient room temperature to the learning model, and
    obtaining a recommended temperature set in the air conditioner.

30. A method for controlling an air conditioner of a network system including the air conditioner and a user terminal, the method comprising:
receiving, by the user terminal, a user input signal depending on a user input selecting an artificial intelligence operation user interface (UI);
transmitting, by the user terminal, an artificial intelligence operation request signal corresponding to the artificial intelligence operation UI to the air conditioner;
transmitting, by the air conditioner, a set temperature of the air conditioner and a current ambient room temperature of the air conditioner to an external device in response to the artificial intelligence operation request signal being received;
receiving, by the air conditioner, a recommended temperature, which is a result obtained by applying the set temperature and the current ambient room temperature to a learning model, from the external device depending on a transmission of the set temperature and the current ambient room temperature; and
setting, by the air conditioner, the received recommended temperature in the air conditioner,
wherein the learning model is a learning model learned using a plurality of set temperatures previously set in the air conditioner and a plurality of current ambient room temperatures, and
wherein the learning model learns to provide the recommended temperature based on the set temperature and the current ambient room temperature.

* * * * *